US008488662B2

(12) United States Patent
Ivory et al.

(10) Patent No.: US 8,488,662 B2
(45) Date of Patent: Jul. 16, 2013

(54) RECEIVER BIT RATE PROCESSING

(75) Inventors: David Stephen Ivory, Ely (GB);
Timothy Perrin Fisher-Jeffes,
Cambridge, MA (US)

(73) Assignee: MediaTek Inc. (TW)

( * ) Notice: Subject to any disclaimer, the term of this patent is extended or adjusted under 35 U.S.C. 154(b) by 1333 days.

(21) Appl. No.: 12/195,131

(22) Filed: Aug. 20, 2008

(65) Prior Publication Data
US 2009/0161742 A1      Jun. 25, 2009

Related U.S. Application Data

(60) Provisional application No. 61/008,966, filed on Dec. 21, 2007, provisional application No. 61/085,265, filed on Jul. 31, 2008.

(51) Int. Cl.
*H04B 17/00* (2006.01)
(52) U.S. Cl.
USPC .......................................... 375/225; 375/315
(58) Field of Classification Search
USPC ................................................ 375/225, 315
See application file for complete search history.

(56) References Cited

U.S. PATENT DOCUMENTS

| 6,052,037 | A | 4/2000 | Kaku et al. ..................... 332/100 |
| 2005/0201283 | A1* | 9/2005 | Yoon et al. ..................... 370/232 |
| 2008/0019348 | A1* | 1/2008 | Shimizu et al. ................ 370/345 |
| 2009/0161796 | A1 | 6/2009 | Fisher-Jeffes ................. 375/317 |
| 2010/0150165 | A1* | 6/2010 | Chang et al. ................... 370/415 |

FOREIGN PATENT DOCUMENTS

EP         1 855 393        11/2007

OTHER PUBLICATIONS

Parker, "Techniques for the Blind Estimation of Signal to Noise Ratio for Quadrature Modulated Signals," International Symposium on Signal Processing and its Applications, ISSPA, Gold Coast, Australia, Aug. 25-30, 1996, pp. 238-241.
3GPP TS 25.212 V5 10.0, 3rd Generation Partnership Project Technical Specification Group Radio Access Network; Multiplexing and channel coding (FDD), Jun. 2005.

* cited by examiner

*Primary Examiner* — Shuwang Liu
*Assistant Examiner* — Michael Neff
(74) *Attorney, Agent, or Firm* — Fish & Richardson P.C.

(57) ABSTRACT

This patent application relates generally to wireless communications systems, and, more particularly, to mobile station receiver architecture.

55 Claims, 9 Drawing Sheets

RECEIVER BIT RATE PROCESSING

CROSS-REFERENCE TO RELATED APPLICATION

This application claims priority based on U.S. Provisional Application Ser. No. 61/008,966, filed Dec. 21, 2007 and U.S. Provisional Application Ser. No. 61/085,265, filed Jul. 31, 2008, which are both hereby incorporated by reference in their entirety.

TECHNICAL FIELD

This patent application relates generally to wireless communications systems, and, more particularly, mobile station receiver architecture.

BACKGROUND

High-Speed Downlink Packet Access (HSDPA) is a 3G (third generation) mobile telephony communications protocol which allows networks based on Universal Mobile Telecommunications System (UMTS) to have higher data transfer speeds and capacity and lower latency to end users. HSDPA is an integral feature of Release 5 of the $3^{rd}$ Generation Partnership Project (3GPP) specification and supports downlink speeds of up to 14.4 Mbit/s and round trip delays of 70 ms. To support HSDPA, the High-Speed Downlink Shared Channel (HS-DSCH) has been added to the UMTS specification. HS-DSCH is the transport channel carrying the user data with HSDPA operation.

HS-DSCH lacks two fundamental features of other wideband Code Division Multiple Access (WCDMA; wideband CDMA) channels—variable spreading factor and fast power control. Instead, it gains an improvement in downlink performance through the utilization of adaptive modulation and coding (AMC), a fast packet scheduling algorithm at the base station, and fast retransmissions from the base station to the mobile station receiver, known as hybrid automatic repeat-request (HARQ).

HARQ processes use incremental redundancy (IR) and chase combining, where data may be transmitted multiple times using different coding techniques. When a corrupt packet is received, a decoder at the receiver combines it with the retransmitted packets in order to correct the errors as efficiently as possible. Even if the retransmissions are corrupted, the combined decoding efforts can still yield an error-free packet.

SUMMARY

In general, in some aspects, a method of implementing de-rate matching of soft decisions is presented. The method is performed by a mobile station in a wireless network. The method includes receiving the soft decisions in a sequence. The method also includes determining a stream tag for each soft decision in the sequence. The method also includes determining a de-rate matching command for each soft decision in the sequence. The method also includes sequentially processing each soft decision in the sequence using the stream tag and the de-rate matching command for the soft decision.

Implementations may include one or more of the following features.

The method may also include detecting the soft decisions from a payload. The payload may be sent from a base station in the wireless network and may be received at the mobile station. The method may also include pre-processing the soft decisions detected from the payload to put the soft decisions in a format for de-rate matching.

In the method, the de-rate matching command may indicate, for each soft decision in the sequence, at least one of whether a bit following a bit represented by the soft decision was punctured or whether the bit represented by the soft decision was repeated.

In the method, sequentially processing each soft decision in the sequence may include, if the de-rate matching command indicates that a bit following a bit represented by the soft decision was punctured, inserting one or more additional soft decisions after the soft decision. The one or more additional soft decisions may be of value zero.

In the method, sequentially processing each soft decision in the sequence may include, if the de-rate matching command indicates that a bit represented by the soft decision was repeated, combining the soft decision with one or more subsequent soft decisions received in the sequence to form a combined soft decision. The one or more subsequent soft decisions may share the same stream tag as the soft decision. In the method, combining the soft decision may include combining the soft decision with a first subsequent soft decision of the one or more subsequent soft decisions to form a first combined soft decision. The soft decision may be part of one type of data stream as identified by the stream tag. In the method, combining the soft decision may also include processing another soft decision. The another soft decision may be part of another type of data stream as identified by another stream tag. In the method, combining the soft decision may also include storing the first combined soft decision in a memory while processing the another soft decision. In the method, combining the soft decision may also include combining the first combined soft decision with remaining soft decisions of the one or more subsequent soft decisions to form the combined soft decision. The method may also include reducing a bit width of the combined soft decision.

In the method, each soft decision in the sequence may be part of one type of N types of data streams. The stream tag may have one of N values and the stream tag may identify, for each soft decision in the sequence, which type of the N types of data streams the soft decision is part of. In the method, one of the N types of data streams may be derived from another one of the N types of data streams. In the method, N may be equal to 3. The N types of data streams may include a systematic type, a parity one type, and a parity two type. If the soft decision is part of the systematic type, the stream tag may identify the soft decision as part of the systematic type. If the soft decision is part of the parity one type, the stream tag may identify the soft decision as part of the parity one type. If the soft decision is part of the parity two type, the stream tag may identify the soft decision as part of the parity two type. The method may also include determining, for each of the N types of data streams, a padding command. The padding command may be indicative of whether the type of data stream requires padding. The method may also include, if one or more of the N types of data streams requires padding, inserting one or more soft decisions of value zero after the soft decisions in the sequence have been sequentially processed. The method may also include, for each soft decision in the sequence that has been sequentially processed, generating a memory address for the soft decision using the stream tag. The memory address may identify a location in a buffer. The method may also include, for each soft decision in the sequence that has been sequentially processed, transferring the soft decision to the buffer at the location. The method may also include storing the soft decisions in the sequence in parallel in the buffer. In the method, storing the soft decisions may include storing all soft decisions in the sequence having a first value of the N values of the stream tag in a first set of locations, and storing all soft decisions in the sequence having an N-th value of the N values of the stream tag in an N-th set of locations. The N-th set of locations may be separate from the first set of locations.

The method may also include, for each soft decision in the sequence, storing the stream tag and the de-rate matching command in a first buffer and storing the soft decision in a second buffer. In the method, sequentially processing each soft decision in the sequence using the stream tag and the de-rate matching command for the soft decision may include retrieving the stream tag and the de-rate matching command from the first buffer and retrieving the soft decision from the second buffer at substantially the same time.

In the method, each soft decision in the sequence may be representative of a bit value.

In the method, determining the stream tag may include determining the stream tag for each soft decision in the sequence using bit collection table parameters.

In the method, determining the de-rate matching command may include determining the de-rate matching command for each soft decision in the sequence using epsilon parameters. The epsilon parameters may include an initial epsilon parameter, an epsilon plus parameter, and an epsilon minus parameter.

In the method, the mobile station may perform the method as part of implementing hybrid automatic repeat-request (HARQ) processing functions.

In general, in some aspects, a method of implementing de-rate matching of soft decisions at a receiver is presented. The receiver receives a payload. The soft decisions are detected from the payload. The method includes receiving soft decisions in a sequence. Each soft decision in the sequence is part of one type of N types of data streams. The method also includes, for each soft decision in the sequence, determining a first value and a second value. The first value indicates whether a bit represented by the soft decision was rate matched at a transmitter. The second value identifies which type of the N types of data streams the soft decision is part of. The method also includes sequentially processing each soft decision in the sequence using the first and second values and using a logical block to process different types of the N types of data streams at different time periods.

In general, in some aspects, a method includes detecting a sequence of soft decisions at a mobile station. Each soft decision is part of at least a first type of data stream or a second type of data stream. The second type of data stream has information that is useful in recovering data values in the first type of data stream. The method also includes determining a stream tag for each soft decision in the sequence. The stream tag indicates which type of data stream the soft decision is a part of. The method also includes determining a de-rate matching command for each soft decision in the sequence. The method also includes sequentially processing each soft decision in the sequence using the stream tag and the de-rate matching command for the soft decision to de-rate match the sequence of soft decisions.

Implementations may include one or more of the following features.

In the method, the first type of data stream may include a systematic type. Soft decisions that are part of the first type of data stream may be representative of systematic bits.

In the method, the second type of data stream may include a parity type. Soft decisions that are part of the second type of data stream may be representative of parity bits. The parity bits may be derived from the systematic bits.

In the method, the second type of data stream may include one of a parity 1 type or a parity 2 type. Soft decisions that are part of the second type of data stream may be representative of parity 1 bits or parity 2 bits, respectively.

In the method, the de-rate matching command may indicate, for each soft decision in the sequence, at least one of whether a bit following a bit represented by the soft decision was punctured or whether the bit represented by the soft decision was repeated.

In general, in some aspects, a mobile station in a wireless network is presented. The mobile station includes a de-rate matching module. The de-rate matching module is configured to de-rate match soft decisions received in a sequence. The de-rate matching module includes a bit collection module configured to determine a stream tag for each soft decision in the sequence. The de-rate matching module also includes a pattern generator configured to determine a de-rate matching command for each soft decision in the sequence. The de-rate matching module also includes one or more logical blocks configured to sequentially process each soft decision in the sequence using the stream tag and the de-rate matching command for the soft decision.

Implementations may include one or more of the following features.

The mobile station may also include a detector configured to detect the soft decisions from a payload. The payload may be sent from a base station in the wireless network and may be received at the mobile station. The mobile station may also include a pre-processing module configured to pre-process the soft decisions detected from the payload to put the soft decisions in a format for de-rate matching.

In the mobile station, the de-rate matching command may indicate, for each soft decision in the sequence, at least one of whether a bit following a bit represented by the soft decision was punctured or whether the bit represented by the soft decision was repeated.

In the mobile station, the one or more logical blocks may be configured to sequentially process each soft decision in the sequence by, if the de-rate matching command indicates that a bit following a bit represented by the soft decision was punctured, inserting one or more additional soft decisions after the soft decision. The one or more additional soft decisions may be of value zero.

In the mobile station, the one or more logical blocks may be configured to sequentially process each soft decision in the sequence by, if the de-rate matching command indicates that a bit represented by the soft decision was repeated, combining the soft decision with one or more subsequent soft decisions received in the sequence to form a combined soft decision. The one or more subsequent soft decisions may share the same stream tag as the soft decision.

In the mobile station, the one or more logical blocks may include a memory. The one or more logical blocks may be configured to sequentially process each soft decision in the sequence by, if the de-rate matching command indicates that a bit represented by the soft decision was repeated, combining the soft decision with a first subsequent soft decision received in the sequence to form a first combined soft decision. The soft decision may be part of one type of data stream as identified by the stream tag. The one or more logical blocks may be configured to sequentially process each soft decision in the sequence by, if the de-rate matching command indicates that a bit represented by the soft decision was repeated, processing another soft decision. The another soft decision may be part of another type of data stream as identified by another stream tag. The one or more logical blocks may be configured to sequentially process each soft decision in the sequence by, if the de-rate matching command indicates that a bit represented by the soft decision was repeated, storing the first combined soft decision in the memory while processing the another soft decision. The one or more logical blocks may be configured to sequentially process each soft decision in the sequence by, if the de-rate matching command indicates that a bit represented by the soft decision was repeated, combining the first combined soft decision with one or more subsequent soft decisions received in the sequence to form a combined soft decision. In the mobile station, the de-rate matching module may also include a quantizer configured to reduce a bit width of the combined soft decision.

In the mobile station, each soft decision in the sequence may be part of one type of N types of data streams. The stream tag may have one of N values. The stream tag may identify, for each soft decision in the sequence, which type of the N types of data streams the soft decision is part of. In the mobile station, one of the N types of data streams may be derived from another one of the N types of data streams. In the mobile station, N may be equal to 3. The N types of data streams may include a systematic type, a parity one type, and a parity two type. If the soft decision is part of the systematic type, the stream tag may identify the soft decision as part of the systematic type. If the soft decision is part of the parity one type, the stream tag may identify the soft decision as part of the parity one type. If the soft decision is part of the parity two type, the stream tag may identify the soft decision as part of the parity two type. In the mobile station, the de-rate matching module may also include a control module configured to determine, for each of the N types of data streams, a padding command. The padding command may be indicative of whether the type of data stream requires padding. The de-rate matching module may also include an output multiplexer configured to, if one or more of the N types of data streams requires padding, insert one or more soft decisions of value zero after the soft decisions in the sequence have been sequentially processed. The mobile station may also include a buffer, an address generator, and combine logic. The address generator may be configured to, for each soft decision in the sequence that has been sequentially processed, generate a memory address for the soft decision using the stream tag. The memory address may identify a location in the buffer. The combine logic may be configured to transfer the soft decision to the buffer at the location. In the mobile station, the buffer may be configured to store the soft decisions in the sequence in parallel by storing all soft decisions in the sequence having a first value of the N values of the stream tag in a first set of locations. The buffer may also be configured to store the soft decisions in the sequence in parallel by storing all soft decisions in the sequence having an N-th value of the N values of the stream tag in an N-th set of locations. The N-th set of locations may be separate from the first set of locations.

In the mobile station, the de-rate matching module may also include a first buffer and a second buffer. The first buffer may be configured to store, for each soft decision in the sequence, the stream tag and the de-rate matching command. The second buffer may be configured to store, for each soft decision in the sequence, the soft decision. The one or more logical blocks may also be configured to retrieve the stream tag and the de-rate matching command from the first buffer and retrieve the soft decision from the second buffer at substantially the same time.

In the mobile station, each soft decision in the sequence may be representative of a bit value.

In the mobile station, the bit collection module may be configured to determine the stream tag for each decision in the sequence by using bit collection table parameters.

In the mobile station, the pattern generator may be configured to determine the de-rate matching command for each soft decision in the sequence by using epsilon parameters. The epsilon parameters may include an initial epsilon parameter, an epsilon plus parameter, and an epsilon minus parameter.

In the mobile station, the de-rate matching module may be configured to de-rate match soft decisions as part of implementing hybrid automatic repeat-request (HARQ) processing functions.

In general, in some aspects, an apparatus includes a receiver configured to receive a payload and to detect soft decisions from the payload. The receiver includes a de-rate matching module configured to receive the soft decisions in a sequence. Each soft decision in the sequence is part of one type of N types of data streams. The de-rate matching module includes one or more first logical blocks configured to, for each soft decision in the sequence, determine a first value and a second value. The first value indicates whether a bit represented by the soft decision was rate matched at a transmitter. The second value identifies which type of the N types of data streams the soft decision is part of. The de-rate matching module includes one or more second logical blocks configured to sequentially process each soft decision in the sequence using the first and second values and configured to process different types of the N types of data streams at different time periods.

Implementations may include one or more of the following features.

In the apparatus, the one or more first logical blocks may include a bit collection module and a pattern generator.

In the apparatus, the one or more second logical blocks may include an accumulator.

In general, in some aspects, an mobile station includes a receiver configured to detect a sequence of soft decisions. Each soft decision is part of at least a first type of data stream or a second type of data stream. The second type of data stream has information that is useful in recovering data values in the first type of data stream. The receiver includes a de-rate matching module configured to receive the sequence of soft decisions. The de-rate matching module includes a bit collection module configured to determine a stream tag for each soft decision in the sequence. The stream tag indicates which type of data stream the soft decision is part of. The de-rate matching module also includes a pattern generator configured to determine a de-rate matching command for each soft decision in the sequence. The de-rate matching module also includes one or more logical blocks configured to sequentially process each soft decision in the sequence using the stream tag and the de-rate matching command for the soft decision to de-rate match the sequence of soft decisions.

Implementations may include one or more of the following features.

In the mobile station, the first type of data stream may include a systematic type. Soft decisions that are part of the first type of data stream may be representative of systematic bits.

In the mobile station, the second type of data stream may include a parity type. Soft decisions that are part of the second type of data stream may be representative of parity bits. The parity bits may be derived from the systematic bits.

In the mobile station, the second type of data stream may include one of a parity 1 type or a parity 2 type. Soft decisions that are part of the second type of data stream may be representative of parity 1 bits or parity 2 bits, respectively.

In the mobile station, the de-rate matching command may indicate, for each soft decision in the sequence, at least one of whether a bit following a bit represented by the soft decision was punctured or whether the bit represented by the soft decision was repeated.

The foregoing methods may be implemented as one or more machine-readable media storing instructions that are executable on one or more processing devices to implement the methods. The foregoing methods may be implemented as a computer program product comprises of instructions that are stored on one or more machine readable media, and that are executable on one or more processing devices. The foregoing methods may be implemented as an apparatus or system that includes one or more processing devices and memory to store executable instructions to implement the methods.

The example methods and example implementations of the methods described above may have one or more of the following advantages. Reverse bit collection and de-rate matching process may be combined. Time sharing and context-switching techniques may be used to de-rate match multiple data streams sequentially, rather than de-rate matching the multiple data streams in parallel. Logic blocks (e.g., one logic block) may be reused in de-rate matching different data streams at different time periods. These features may allow for a small chip area and low power consumption.

The details of one or more examples are set forth in the accompanying drawings and the description below. Further features, aspects, and advantages will become apparent from the description, the drawings, and the claims.

DETAILED DESCRIPTION

Figure 1:
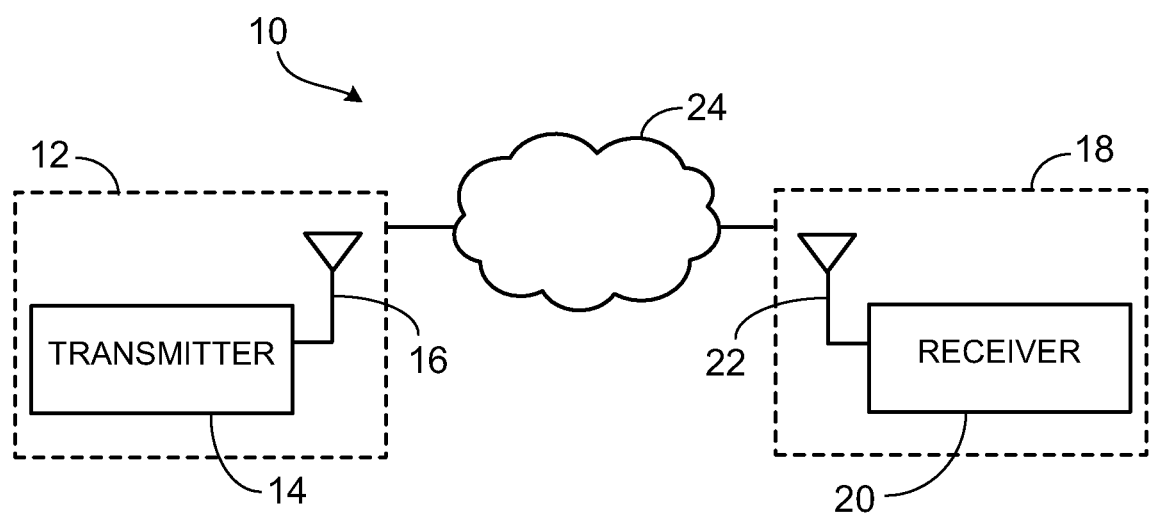
FIG. 1 is a block diagram of an example wireless network.

FIG. 1 is a diagram of an example wireless network 10. A base station 12 includes a transmitter 14 and an antenna 16 for forward link transmissions to a mobile station 18. The base station 12 also includes a receiver (not shown) to receive reverse link transmissions from a transmitter (not shown) on the mobile station 18. The mobile station 18 includes a receiver 20 and an antenna 22 for receiving forward link transmissions from the base station 12. The forward and reverse link transmissions occur over a wireless communication channel 24, as illustrated in FIG. 1.

As described in more detail below, in one implementation, the base station 12 includes an HSDPA HARQ functional block that processes an input data stream (e.g., voice or user data) into three data streams: a stream of Systematic bits, a stream of Parity 1 bits, and a stream of Parity 2 bits. The Systematic bits include the original data to be transmitted, while the parity 1 bits and the parity 2 bits represent turbo coded versions of the original data. Thus, the parity 1 bits and the parity 2 bits may be derived from the Systematic bits, i.e., the original data. The original data may be recovered by turbo decoding at the receiver 20 of the mobile station 18. The three data streams are processed by one or more rate matching stages to match a data capacity of the wireless communication channel 24. The three rate-matched data streams are combined by a Bit Collection block into payloads that are modulated and transmitted to the mobile station 18. A payload may include, for example, a rate equalized encoded transport block. A payload may more generally refer to data sent by the transmitter such as the transmitter 14. The receiver 20 of the mobile station 18 performs the reverse function of the transmitter 14, e.g., reverse bit collection, de-rate matching, and turbo decoding to convert the received signals back to the original input data stream (e.g., voice or user data).

A feature of the receiver 20 is that reverse bit collection and de-rate matching processes are combined, and the receiver 20 uses time sharing and context-switching techniques to de-rate match multiple data streams (e.g., streams of Systematic bits, Parity 1 bits, and Parity 2 bits) sequentially, rather than de-rate matching the multiple data streams in parallel. Logic blocks (e.g., one logic block) can be reused in de-rate matching different data streams at different time periods. This allows the receiver 20 to have a small chip area and potentially low power consumption.

Figure 2:
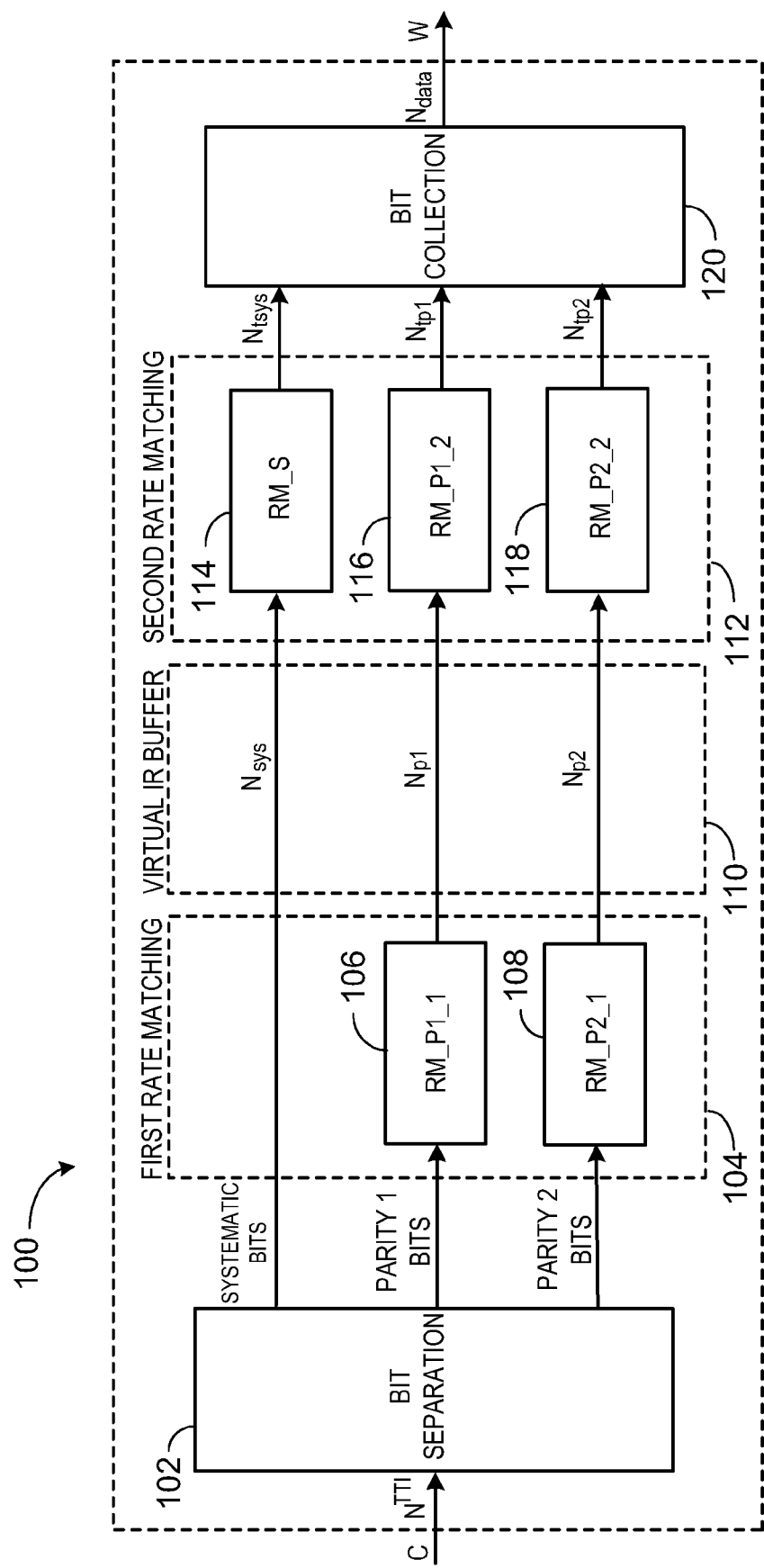
FIG. 2 is a block diagram showing example HSDPA HARQ functionality of the network transmitter at the base station.

FIG. 2 is a block diagram showing an example HSDPA HARQ functional block 100 of the network transmitter 14 at the base station 12. This functionality is defined, e.g., in Release 5 of the 3GPP Standard, which is incorporated herein by reference. In particular, see 3G WCDMA standard 3GPP TS 25.212 Version 5.10.0 Release 5: "Multiplexing and Channel Coding (FDD)", section 4.5.4, June 2005, pg. 54-57. Generally, Transmission Time Interval data ($N_{TTI}$) from an interleaver (not shown) and a turbo coder (not shown) are sent to a Bit Separation block 102 and separated into three data streams: a data stream of Systematic bits, a data stream of Parity 1 bits, and a data stream of Parity 2 bits. Turbo coding is described in more detail in, e.g., Release 5 of the 3GPP Standard. In particular, see 3G WCDMA standard 3GPP TS 25.212 Version 5.10.0 Release 5: "Multiplexing and Channel Coding (FDD)", section 4.2.3.2, June 2005, pp. 16-22. The three parallel streams enter a First Rate Matching block 104 with the Parity 1 and Parity 2 streams passing through respective Parity 1 and Parity 2 First Rate Matching stages 106, 108. The three data streams are then stored in a Virtual IR Buffer 110 before being sent to respective Second Rate Matching stages 114, 116, 118 in a Second Rate Matching block 112. Depending on the particular payload $N_{data}$ being transmitted by the transmitter 14, the respective Systematic, Parity 1, and Parity 2 data streams may be punctured (i.e., bits within one or more data streams are removed) or repeated (i.e., bits within one or more data streams are repeated). Other Systematic, Parity 1, and Parity 2 bits may be simply passed through the Second Rate Matching block 112. Puncturing may occur at the First Rate Matching block 104 as well. The puncturing (or repeating) generally occurs so that the transmitter 14 may arrive at a number of bits to match a data capacity of the wireless communication channel 24 between the base station 12 and the mobile station 18.

The three streams emerge from the Second Rate Matching block 112 and are input in parallel to a Bit Collection block 120. The Bit Collection block 120 may construct a bit collection table that ultimately specifies the order of Systematic, Parity 1, and Parity 2 bits in the payload $N_{data}$.

The Systematic, Parity 1, and Parity 2 "bits" in the data streams and in the payload $N_{data}$ are bit values of "0" or "1" that the transmitter 14 on the base station 12 intends to send to the mobile station 18.

The transmitter 14 on the base station 12 sends control data to the mobile station 18, which may include information that is related to and that may potentially change with each particular payload sent by the transmitter, such as the type of modulation that is used, e.g., 16 QAM (Quadrature Amplitude Modulation) modulation or QPSK (Quadrature Phase-Shift Keying) modulation. The control data may include other information, such as information about a bit collection table corresponding to a particular payload, and information regarding whether rate matching (i.e., puncturing or repetition) occurred with a particular payload.

Figure 3A:
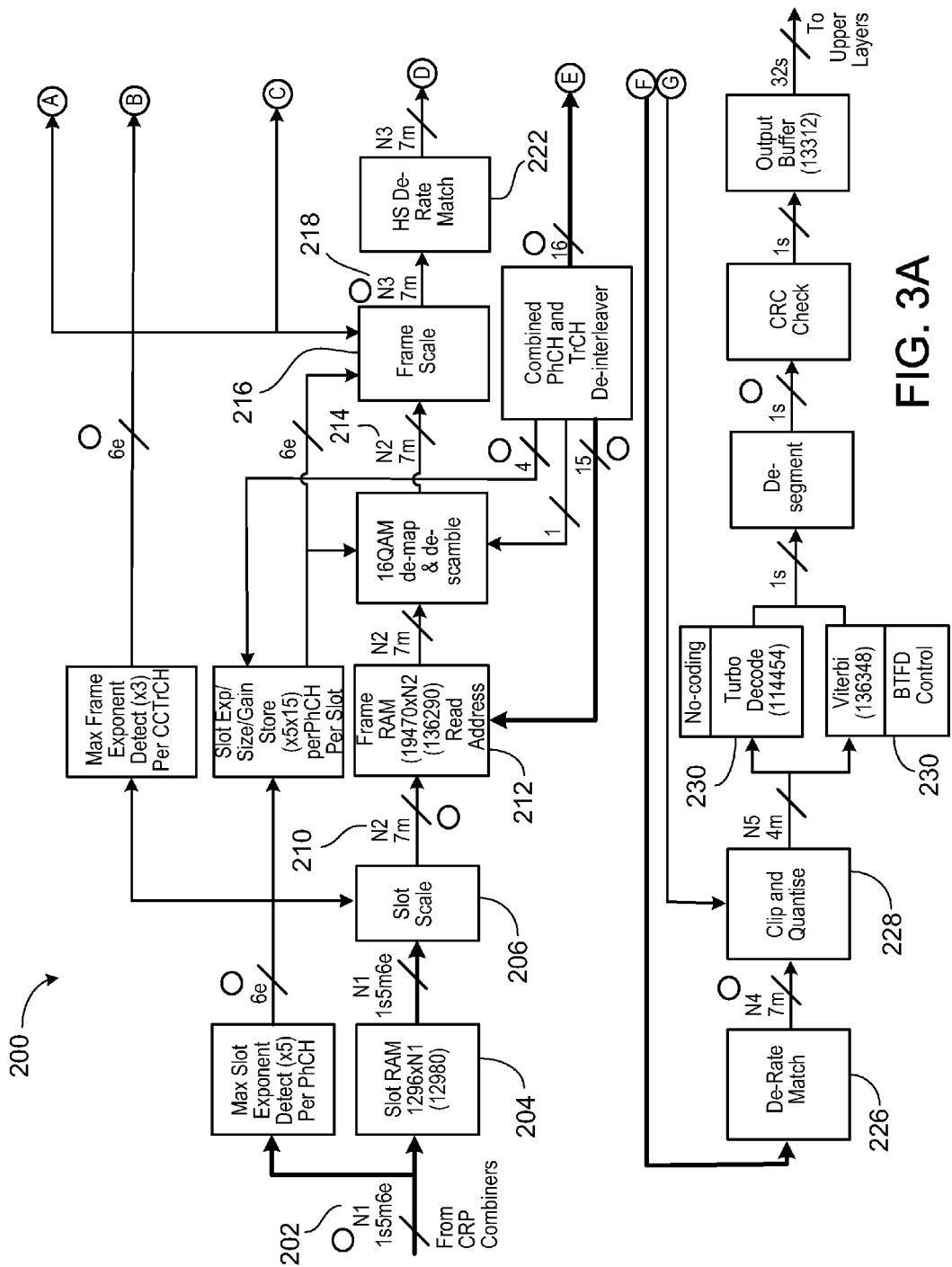
FIGS. 3A and 3B are a block diagram of an example HARQ receiver architecture.
Figure 3B:
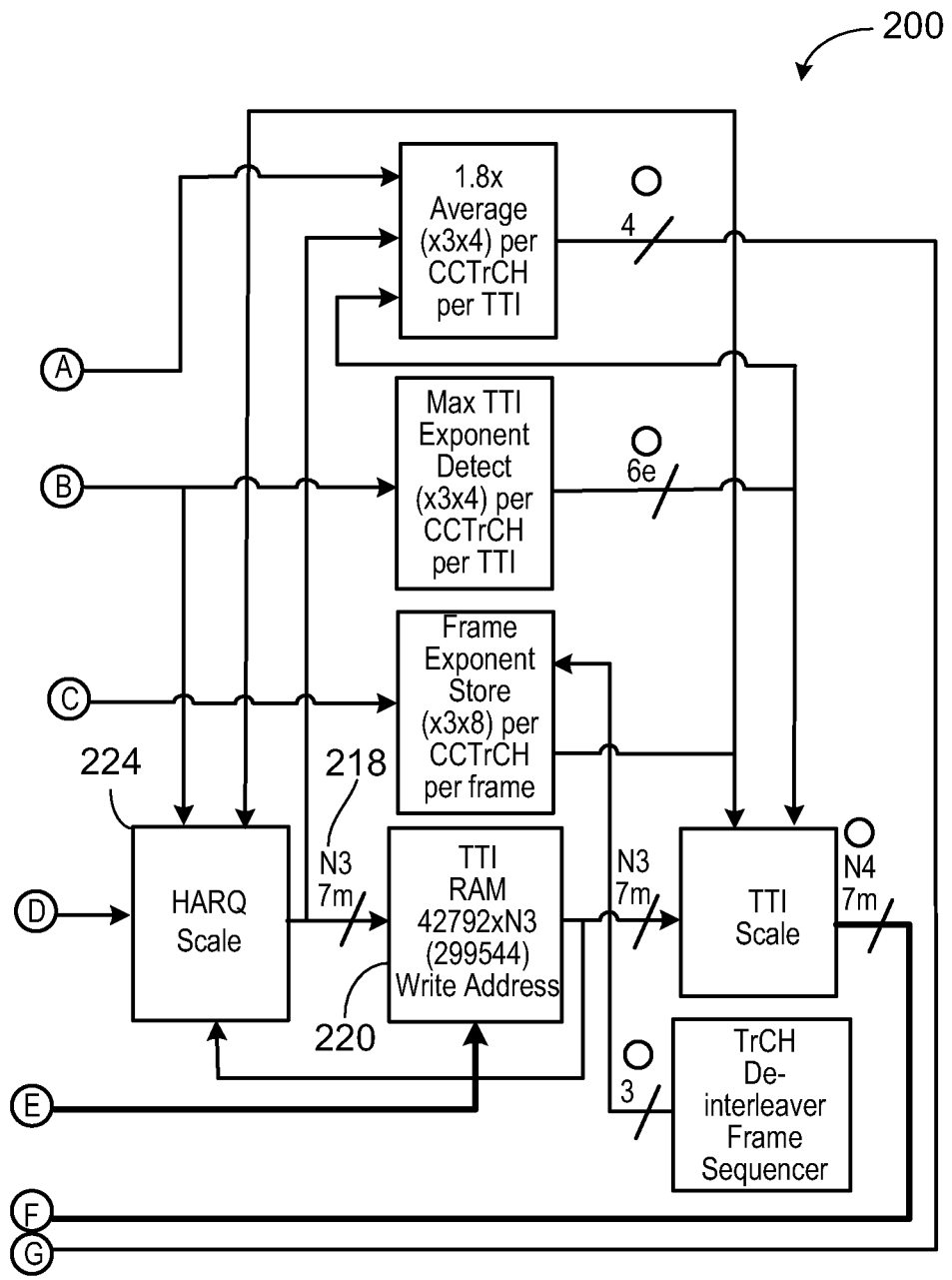

FIGS. 3A and 3B are a block diagram of an example HARQ receiver architecture 200 that may be implemented at the receiver 20 of the mobile station 18 of FIG. 1. The architecture implements Down-link Bit-Rate Processing (DLBP).

Generally, in the HARQ receiver architecture 200 of FIGS. 3A and 3B, blocks of data flow through a very long data buffering and processing pipe. Blocks of data in the form of soft decisions are produced by chip rate processing (CRP) combiners to the left of FIG. 3A and slot memory (Slot RAM) 204 is used to store a slot of soft decisions. The soft decisions may undergo scaling and rescaling by, e.g., a Slot Scale block 206 and a Frame Scale block 216, respectively, with intermediate storage in a Frame memory (Frame RAM) 212. Eventually the soft decisions are transferred to a TTI memory (TTI RAM) 220 (see FIG. 3B). The TTI memory 220 is an example implementation of an IR Buffer. FIG. 3 is merely an example architecture showing one implementation of a HARQ receiver; other architectures may be used. The functional blocks and bit widths shown in FIGS. 3A and 3B are merely examples and other functional blocks and other bit widths may be used.

The soft decisions are input to a Second De-Rate Matching block (HS (High-Speed) De-Rate Match) 222 (see FIG. 3A). The Second De-Rate Matching block 222 reverses the effects of the Second Rate Matching block 112 and the Bit Collection block 120 in the HSDPA HARQ functional block 100 (see FIG. 2) of the transmitter 14 at the base station 12 (see FIG. 1). The soft decisions continue through a HARQ Scale block 224 to the TTI memory 220 (see FIG. 3B).

The soft decisions eventually proceed to a First De-Rate Matching block 226, and then to a Clip and Quantize block 228, before reaching decoders 230. Redundancy checking may then be used to confirm that the data from the transmitter 14 has been correctly received. An acknowledgement message may be sent back to the transmitter 14 at the base station 12 if the packet, or payload, has been received correctly. If the payload has not been received correctly, the receiver 20 may send a negative acknowledgement message to the transmitter 14, which will, in this event, send another payload including more information, partially or completely the same, to assist in recovering the original data by turbo decoding.

Soft decisions may in general include a bit representing a decision on whether a received signal is a "0" or a "1", and may in general include other bits that indicate the degree of confidence in the decision. The bits may be assigned based on comparison of the received signal to a number of thresholds at a threshold detector (not shown) on the receiver 20 of the mobile station 18. It may be that the higher the numerical value of the soft decision, the higher the confidence that the soft decision is a "0", while the lower the numerical value of the soft decision the higher the confidence that the soft decision is a "1". In an implementation, a signed binary scheme may be used to represent the soft decisions, with the highest bit being a "1" for a negative number and a "0" for a positive number, so that the more positive the soft decision is, the higher the confidence that the soft decision is a "0", while the more negative the soft decision is, the higher the confidence that the soft decision is a "1". Thus, a soft decision may be a data word that is M bits wide (with M varying on a number of factors, such as which stage of processing the soft decision is undergoing) and that is typically representative of a bit value. In an implementation, the receiver 20 of the mobile station 18 detects soft decisions sent by the transmitter 14 of the base station 12.

Referring again to FIG. 2, the receiver 20 of the mobile station 18 (of FIG. 1) may generally be tasked with reversing the processing of the example HSDPA HARQ functional block 100 of the network transmitter 14 at the base station 12. That is, part of processing at the receiver 20 may progress from reverse Bit Collection (e.g., identifying different data streams of incoming soft decisions) (compare Bit Collection block 120 of FIG. 2) to Second De-Rate Matching (compare Second Rate Matching block 112) to the IR Buffer (compare buffer 110), and on to First De-Rate Matching (compare First Rate Matching block 104), for example.

In an implementation, each soft decision is a Systematic bit, a Parity 1 bit, or a Parity 2 bit. Implementing a First De-Rate Matching block (e.g., block 226) so that parallel processing is used for each data stream in a received payload, e.g., Systematic, Parity 1, and Parity 2, may present several inefficiencies and challenges such as a high chip area taken up by the parallel architecture, and high power consumption due to the parallel processing. For example, if a single reverse bit collection block, three separate and parallel rate matching blocks, and an IR buffer were implemented at the receiver 20, five main pieces of logic would be required.

Combining at least the functions of reverse bit collection and second de-rate matching (e.g., in a single block) and de-rate matching the data streams sequentially, or substantially sequentially, rather than in parallel, may reduce chip area and reduce power consumption. In this way, logic may be time-shared and context-switched so that soft decisions from different data streams (e.g., Systematic, Parity 1, and Parity 2) may be processed through the same physical hardware logic at different times. Logical function A can be used to process a Systematic soft decision at a first time period, while the same function can be used to process a Parity 2 soft decision at a second time period, instead of having, e.g., logical functions A, B, and C to process respective Systematic, Parity 1, and Parity 2 data streams.

The implementations described herein may be applied to multiple standards, such as Time Division Synchronous Code Division Multiple Access (TDSCDMA) and wideband CDMA. The implementations described may use the HARQ processing function for HSDPA in the Frequency Division Duplexing (FDD) mode of operation, the Time Division Duplexing (TDD) mode of operation, or both.

Figure 4:
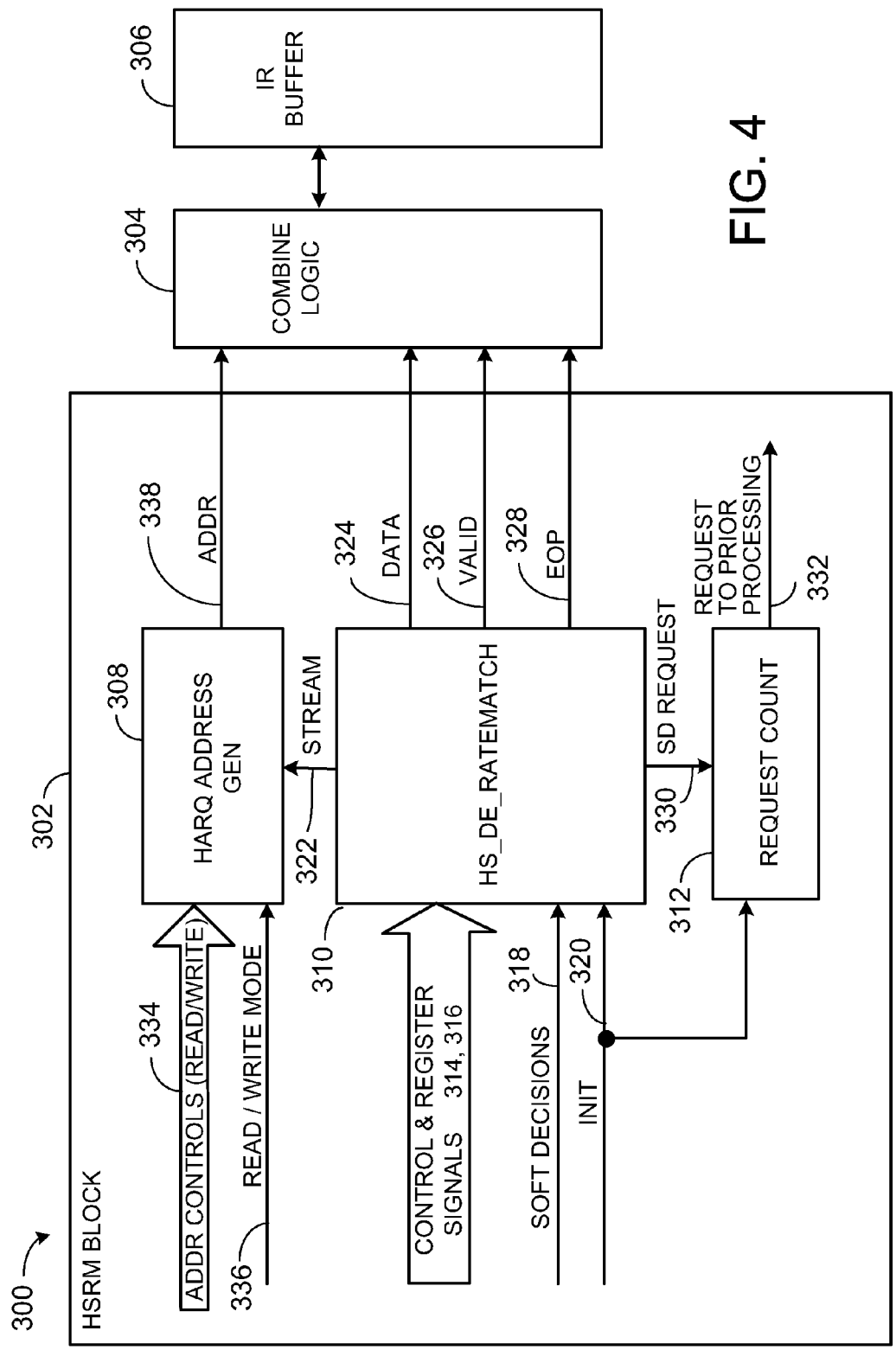
FIG. 4 is a high-level block diagram of an example implementation of a de-rate matching, combining, and buffering architecture.

FIG. 4 is a high-level block diagram of an example implementation 300 of a de-rate matching, combining, and buffering architecture. The implementation 300 of FIG. 4 includes a Main Second De-Rate Matching block 302 (e.g., block 222 of FIG. 3A), a Combine Logic block 304, and an IR Buffer 306 (e.g., TTI memory 220 of FIG. 3B). The Second De-Rate Matching block 302 may include a HARQ Address Generator module 308, a Second De-Rate Matching module 310 ("HS_DE_RATEMATCH") and a Request Count module 312.

The Second De-Rate Matching module 310 receives Control and Register Signals 314, 316, soft decisions 318 ("SOFT DECISIONS"), and an initialization pulse 320 ("INIT"). The soft decisions 318 are received one by one, in sequence. The HS_DE_RATEMATCH module 310 outputs a stream tag signal 322 ("STREAM"), sequentially processed soft decisions 324 ("DATA"), a data valid value 326 ("VALID"), an end of payload indicator 328 ("EOP"), and a soft decision request value 330 ("SD REQUEST"). The sequentially processed soft decisions 324 are output one by one, in sequence.

The Request Count module 312 receives the initialization pulse 320 ("INIT") and the soft decision request value 330 ("SD REQUEST"). The Request Count module 312 outputs a signal 332 to request a soft decision ("REQUEST TO PRIOR PROCESSING") from one or more prior processing blocks (e.g., Frame Scale block 216 and Frame memory 212 of FIG. 3A).

The Request Count module 312 may receive a signal from software (not shown) that tells the module 312 how many soft decisions are to be processed in the payload. The Request Count module 312 may include a counter that may be initialized with the initialization pulse 320 ("INIT") and a number of soft decisions to be processed. Then, each time a soft decision request value 330 ("SD REQUEST") is received from the HS_DE_RATEMATCH module 310, the counter may be decremented and a new soft decision requested via the signal 332 ("REQUEST TO PRIOR PROCESSING"). In this way, the Request Count module 312 may keep track of unserviced soft decisions and may stop requesting soft decisions when all soft decisions have been processed by the HS_DE_RATEMATCH module 310, e.g., when the counter on the module 312 has counted down to zero. In this way, the Request Count module 312 may ensure that the HS_DE_RATEMATCH module 310 receives the correct number of soft decisions.

The soft decisions 318 ("SOFT DECISIONS") arrive and are input to the HS_DE_RATEMATCH module 310 as they are retrieved from one or more prior processing blocks. A de-interleaver circuit (not shown in FIG. 4) may be used in pre-processing to retrieve soft decisions, one by one, from an earlier memory stage (e.g., Frame memory 212 of FIG. 3A).

In an implementation, each soft decision 318 is one of three types, either a Systematic bit, a Parity 1 bit, or a Parity 2 bit (i.e., multiple bit representations of a single bit). There may be three types of data streams, Systematic, Parity 1, and Parity 2 bit, with each data stream including soft decisions of that respective type. In general, the soft decisions may arrive at the HS_DE_RATEMATCH module 310 in sequence but not in any particular order of type. For example, a soft decision representing a Systematic bit may be followed by a Parity 1 bit, a Parity 2 bit, or another Systematic bit. A Parity 1 bit may be followed by a Systematic bit or another Parity 1 bit. A Parity 2 bit may be followed by a Systematic bit or another Parity 2 bit.

Each soft decision 318 will generally have a stream tag associated with it (e.g., stream tag signal 322 ("STREAM")). A soft decision 318 representing a Systematic bit will have a Systematic stream tag associated with it, while soft decisions 318 representing Parity 1 and Parity 2 bits will have respective Parity 1 and Parity 2 stream tags associated with them. The stream tags are generated by the HS_DE_RATEMATCH module 310 are and associated with the soft decisions 318 ("SOFT DECISIONS") and the sequentially processed soft decisions 324 ("DATA") in the module 310, and are output as the stream tag signal 322 ("STREAM"). The stream tag signal 322 may take on, e.g., four values, a value indicating Systematic, a value indicating Parity 1, a value indicating Parity 2, and a value indicating the end of soft decisions detected for a particular payload. The stream tag signal 322 indicates, for each soft decision 324, the type of the soft decision 324 and the data stream to which the soft decision 324 belongs.

As described above, the transmitter 14 on the base station 12 sends control data to the mobile station 18. This control data may include, or may be used to generate, the Control and Register Signals 314, 316 that are provided to the Second De-Rate Matching module 310 (HS_DE_RATEMATCH). These Signals 314, 316 are described in more detail below, but in general may include information that is related to particular payloads, such as the type of modulation that is used, e.g., 16 QAM (Quadrature Amplitude Modulation) modulation or QPSK (Quadrature Phase-Shift Keying) modulation. These Signals 314, 316 may include other information, such as information about a bit collection table corresponding to a particular payload, and information regarding whether rate matching (i.e., puncturing or repetition) occurred with a particular payload.

The sequentially processed soft decisions 324 ("DATA") are output from the HS_DE_RATEMATCH module 310 one by one, in sequence. The data valid value 326 ("VALID") indicates, for each soft decision 324, whether the "DATA" 324, is valid or not. The end of payload indicator 328 ("EOP") indicates when the end of a particular payload (and the end of soft decisions for that particular payload) has been reached. In general, the sequentially processed soft decisions 324 ("DATA"), the data valid value 326 ("VALID"), and the stream tag signal 322 ("STREAM") will come out of the HS_DE_RATEMATCH module 310 synchronized with one another due to synchronization logic in the module 310. In general, these outputs may be paced so that the Combine Logic block 304 may work properly.

Using a single set of outputs (DATA 324, VALID 326, STREAM 322) for all data streams (e.g., Systematic, Parity 1, and Parity 2), rather than using parallel sets of outputs corresponding to each data stream, in general may reduce the amount of logic that accompanies the HS_DE_RATEMATCH module 310, for example, the Combine Logic block 304.

The HARQ Address Generator module 308 receives read/write address control signals 334, a read/write mode signal 336, and the stream tag signal 322 ("STREAM"). The HARQ Address Generator module 308 outputs an address signal 338 ("ADDR") which includes a read or a write address for the IR Buffer 306.

The read/write address control signals 334 may include parameters about a particular payload sent by the transmitter 14 of the base station 16. The parameters may provide, or be used to provide, a base address that may be used by the HARQ Address Generator module 308 to generate addresses for reading soft decisions out of, and writing soft decisions into, the IR Buffer 306. Different base addresses may also be used for read and write operations. The parameters may also provide information regarding the size of the memory to be allocated to each data stream type, e.g., Systematic, Parity 1 and Parity 2, for a particular payload (or for payloads that are intended to represent the same data, with the same or different encoding).

The parameters may include a HARQ process identifier. The HARQ process identifier may be associated with a base address (or addresses) that may be used by the HARQ Address Generator module 308 to generate addresses for soft decisions in the IR Buffer 306. When the transmitter 14 sends the same payload again or sends a different payload intended to represent the same data but with different encoding, the HARQ process identifiers may generally be identical. Soft decisions from a payload having a particular HARQ process identifier may be destined for the same memory allocation, once combined with soft decisions from an earlier received payload sharing the same HARQ process identifier (e.g., in the Combine Logic block 304).

In an example HARQ implementation, the receiver 20 of the mobile station 18 may be capable of handling eight payloads sent by the transmitter 14, with each payload being allocated one of eight HARQ process identifiers. Although the eight payloads may be processed sequentially, rather than in parallel, by HARQ processes on the receiver 20, logic such as the IR Buffer 306 may store soft decisions for eight payloads in parallel. Soft decisions for a particular payload may be stored in three sets of locations corresponding to Systematic, Parity 1, and Parity 2, resulting in eight groups of three sets of location, or twenty four sets of locations in all.

The parameters included in the read/write address control signals 334 may include, in addition to a HARQ process identifier for example, one or more epsilon parameters. The epsilon parameters may also provide information regarding the size of the memory to be allocated to each data stream type, e.g., Systematic, Parity 1 and Parity 2, for a particular payload (or for payloads sharing the same HARQ process identifier, for example). The epsilon parameters may include an EPSILON_PLUS parameter for each data stream type, e.g., Systematic, Parity 1 and Parity 2. The EPSILON_PLUS parameter for Systematic and Parity 2 may provide the HARQ Address Generator module 308 with the size of the memory for Systematic and Parity 2, respectively, while the module 308 may determine the size of the memory for Parity 1 by halving the EPSILON_PLUS parameter for Parity 1.

The HARQ Address Generator module 308 may use the read/write address control signals 334 and the stream tag signal 322 ("STREAM") to generate and output the address signal 338 ("ADDR"). The address signal 338 includes a read or a write address for the IR Buffer 306, depending on whether the module 308 has been placed into read or write mode by the read/write mode signal 336.

In an implementation, for example processing of a payload, the HARQ Address Generator module 308 begins by determining (or receiving) a base address in the IR Buffer 306 associated with the HARQ process identifier of the payload. The module 308 takes the base address, and makes that the beginning address for soft decisions of the Systematic data stream type. To determine the beginning address for soft decisions of the Parity 1 data stream type, the module 308 takes the size of memory to be allocated to the Systematic data stream type for the payload, which may be given by the EPSILON_PLUS parameter for Systematic, and adds this value to the base address. To determine the beginning address for soft decisions of the Parity 2 data stream type, the module 308 takes the size of memory to be allocated to the Parity 1 data stream type for the payload, which may be given by taking half of the EPSILON_PLUS parameter for Parity 1, and adds this value to the beginning address for soft decisions of the Parity 1 data stream type. Once the beginning addresses for soft decisions of the Systematic, Parity 1, and Parity 2 data types have been determined, these addresses are used as beginning values in three respective address counters included in the module 308. That is, the address counters may be initialized to the beginning addresses with each payload that is received.

The HARQ Address Generator module 308 receives values of the stream tag signal 322, which indicate, for each soft decision 324 output by the HS_DE_RATEMATCH module 310, the type of the soft decision 324 and the data stream to which the soft decision 324 belongs. The HARQ Address Generator module 308 context switches between the three address counters based on the value of the stream tag signal 322. In general, the sequentially processed soft decisions 324 may be output by the HS_DE_RATEMATCH module 310 in sequence but not in any particular order of type, as described above. The module 308 increments the address counter that corresponds to the respective data stream type received in the stream tag signal 322.

For example, assume that, for a particular payload, the first soft decision 324 output by the module 310 is of the Systematic data stream type. A stream tag signal 322 indicating "Systematic" will also be output by the module 310. The HARQ Address Generator module 308 receives the stream tag signal 322 indicating "Systematic" and, since this is associated with the first Systematic soft decision, the module 308 outputs (as the address signal 338 ("ADDR")) the beginning address for soft decisions of the Systematic data stream type (i.e., the base address). Next assume that the second soft decision 324 output by the module 310 is also of the Systematic data stream type. The stream tag signal 322 continues to indicate "Systematic" and is received by the module 308. The module 308 increments the address counter that corresponds to the Systematic data stream by one, and outputs (as the address signal 338) the base address plus one. Each time that soft decisions of the Systematic data stream type are output by the module 310 and the module 308 receives the stream tag signal 322 indicating "Systematic", the module 308 increments the address counter that corresponds to the Systematic data stream by one and outputs the resulting address.

Next assume that the third soft decision 324 output by the module 310 is of the Parity 2 data stream type. The stream tag signal 322 now indicates "Parity 2" and is received by the module 308. Since this stream tag is associated with the first Parity 2 soft decision (the third soft decision overall), the module 308 outputs the beginning address for soft decisions of the Parity 2 data stream type (e.g., the base address plus the EPSILON_PLUS value for Systematic plus half of the EPSILON_PLUS value for Parity 1). Each time that soft decisions of the Parity 2 data stream type are output by the module 310 and the module 308 receives the stream tag signal 322 indicating "Parity 2", the module 308 increments the address counter that corresponds to the Parity 2 data stream by one and outputs the resulting address.

When the first Parity 1 soft decision is output by the module 310, the module 308 receives the stream tag signal 322 indicating "Parity 1" from the module 310. The module 308 then outputs the beginning address for soft decisions of the Parity 1 data stream type (e.g., the base address plus the EPSILON_PLUS value for Systematic). Each time that soft decisions of the Parity 1 data stream type are output by the module 310 and the module 308 receives the stream tag signal 322 indicating "Parity 1", the module 308 increments the address counter that corresponds to the Parity 1 data stream by one and outputs the resulting address.

In this way, the HARQ Address Generator module 308 outputs addresses (as the address signal 338) that correspond to, e.g., the sequentially processed soft decisions 324 ("DATA"), and the data valid value 326 ("VALID") that are output from the HS_DE_RATEMATCH module 310.

Assume soft decisions for a payload are detected from the payload at the receiver 20 of the mobile station 18. The payload has a HARQ process identifier that has not been seen by the HARQ Address Generator module 308 before, i.e., the payload represents new data. The module 308 generates addresses that correspond to the sequentially processed soft decisions 324 corresponding to the payload. Each soft decision 324 is input to the IR Buffer 306 at a respective address location provided by the module 308. Depending on the implementation, the Combine Logic block 304 may play a role in placing the soft decision 324 at the respective address location.

The soft decisions 324 corresponding to the payload (which has the particular HARQ process identifier) may ultimately proceed to a decoder stage. The decoder stage may determine, based on analyzing the soft decisions, that the payload was received in error, so that the receiver 20 may send a negative acknowledgement to the base station 12. The transmitter 14 at the base station 12 may send a new payload having the same HARQ process identifier. The payload with the identical HARQ process identifier may include the same data as the prior payload, or may represent the same data but with different encoding. For example, the first payload may include only Systematic and Parity 1 data streams, while a second payload having the same HARQ process identifier and intended to represent the same data may include only Systematic and Parity 2 data streams, or all three data streams, etc.

A subsequently transmitted payload having the identical HARQ process identifier is subsequently received and the HARQ Address Generator module 308 generates IR Buffer 306 addresses that correspond to the sequentially processed soft decisions 324 from the subsequently transmitted payload.

The Combine Logic block 304 receives the addresses (as the address signal 338 ("ADDR")) from the HARQ Address Generator 308, the sequentially processed soft decisions 324 ("DATA"), and the data valid values 326 ("VALID") from the HS_DE_RATEMATCH module 310. For a particular soft decision 324 (e.g., "Soft Decision B"), the Combine Logic block 304 may use pipeline logic to store (or delay) that Soft Decision B for one clock cycle. While the block 304 is storing the Soft Decision B, the block 304 takes the memory address generated from the module 310 for that Soft Decision B and reads the soft decision (e.g., "Soft Decision A" from a prior payload having the same HARQ process identifier) currently stored in the IR Buffer 306 at that memory location. The Combine Logic block 304 may include an adder. At the beginning of the next clock cycle, the block 304 provides the Soft Decision A from the pipeline logic to one input of the adder, and takes and applies the Soft Decision B (retrieved from IR Buffer 306) to the other input of the adder. One clock cycle later, the combined result of Soft Decisions A and B being added together comes out of the adder. The HARQ Address Generator 308 is still holding the same memory address. The Combine Logic 304 is switched to write mode, and then the combined result from the adder is written into the IR Buffer at the memory address. In this way, the Combine Logic 304 performs a "Read, Modify, Write" operation. The Combine Logic 304 reads a previously stored soft decision from the IR Buffer 306, modifies the soft decision by combining it with a corresponding new soft decision from another payload having the same HARQ process identifier, and writes the resulting combined soft decision value into the IR Buffer 306.

Figure 5:
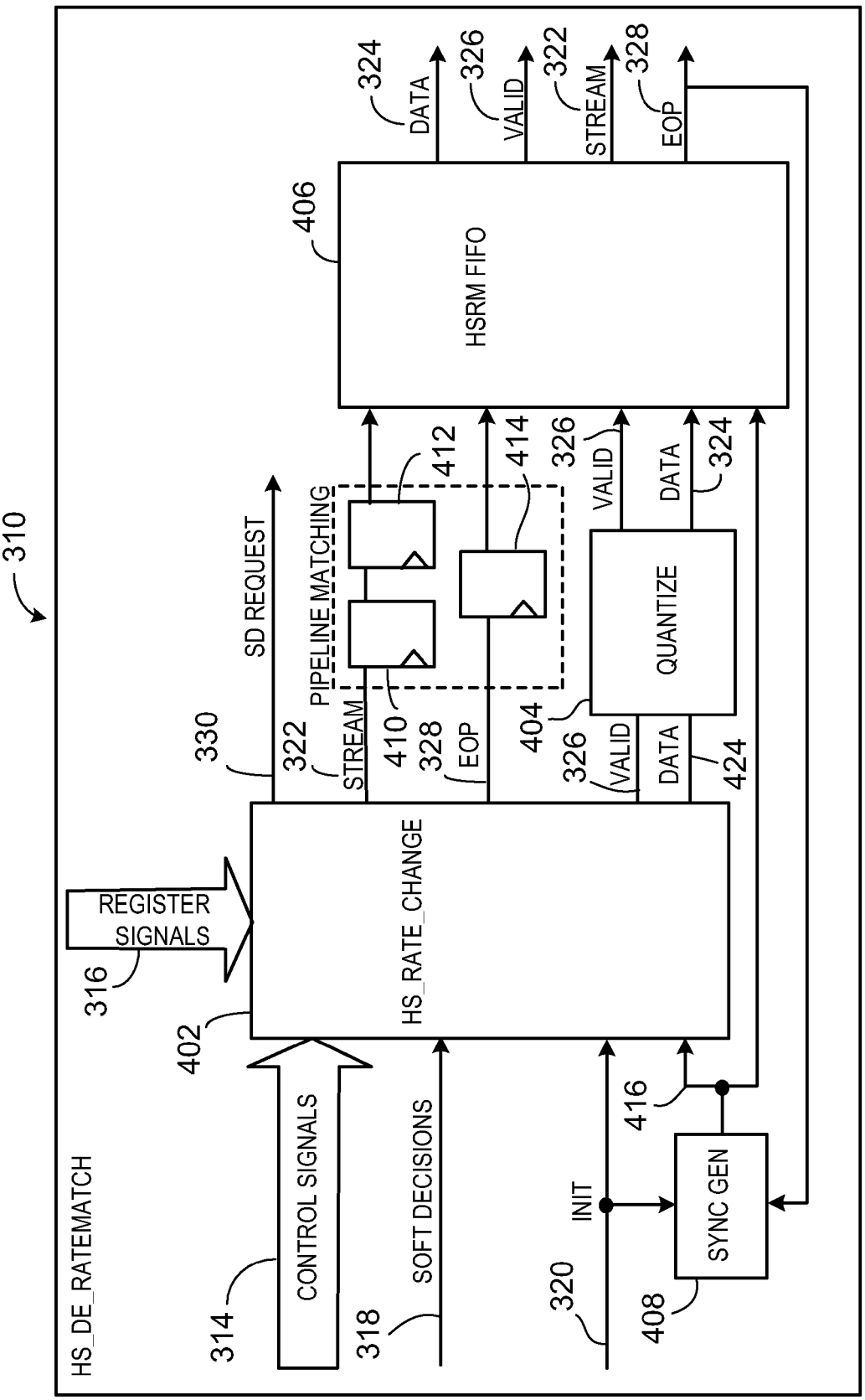
FIG. 5 is a block diagram of an example implementation of a de-rate matching module.

FIG. 5 is a block diagram of an example implementation of the Second De-Rate Matching module 310 ("HS_DE_R-ATEMATCH") of FIG. 4. The implementation of module 310 may include a Rate Change module 402 ("HS_RAT-E_CHANGE"), a Quantize block 404 ("QUANTIZE"), a FIFO (First In First Out) Buffer 406 ("HSRM FIFO"), a Synchronization Generation block 408 ("SYNC GEN"), and pipeline delay stages 410, 412, 414.

Generally, sequentially processed (and de-rate matched) soft decisions 424 are output by the Rate Change module 402. The Quantize block 404 adjusts the bit width of the soft decisions 424, some of which may have increased in bit width due to accumulation processing in the Rate Change module 402, and outputs these decisions as sequentially processed soft decisions 324. The pipeline delay stages 410, 412 match the delay of the Quantize block 404 so that the STREAM 322 signals arrive at the HSRM FIFO 406 at substantially the same time as the respective quantized soft decisions 324. A clock signal 416 from the SYNC GEN block 408 causes soft decisions 324, VALID 326, STREAM 322, and EOP 328 to be read from, or output from, the HSRM FIFO 406 on every other clock cycle, providing appropriate pacing to match the processing time of the Combine Logic block 304 associated with the IR Buffer 306 of FIG. 4.

The Rate Change module 402 receives soft decisions 318 ("SOFT DECISIONS"), Control and Register Signals 314, 316, the initialization pulse 320 ("INIT"), and a clock signal 416 output from the SYNC GEN block 408. The soft decisions 318 are received one by one, in sequence and may be stored in an input register (not shown) prior to being received at the module 402. The HS_RATE_CHANGE module 402 outputs the soft decision request value 330 ("SD REQUEST"), the stream tag signal 322 ("STREAM"), the end of payload or end of packet indicator 328 ("EOP"), sequentially processed soft decisions 424 ("DATA"), and the data valid value 326 ("VALID"). The sequentially processed soft decisions 424 are output one by one, in sequence. The Control and Register Signals 314, 316 are as described above and are discussed in more detail below. An implementation of the Rate Change module 402 is discussed in more detail below.

The Quantize block 404 ("QUANTIZE") receives the sequentially processed soft decisions 424 ("DATA") and outputs the sequentially processed soft decisions 324 ("DATA"), and receives and outputs the data valid value 326 ("VALID"). The Quantize block 404 adjusts the magnitude of the sequentially processed (and de-rate matched) soft decisions 424 received from the Rate Change module 402. If the payload that the soft decisions were detected from included repetition of bits by the transmitter 14, then certain repeated soft decisions processed by the Rate Change module 402 would be accumulated, e.g., added together. The process of adding the soft decisions together generally increases the bit width of the resulting sum, so that certain sequentially processed soft decisions 424 may be represented by a larger bit width. The Quantize block 404 may adjust the magnitude of one or more sequentially processed soft decisions downward by e.g., saturating the soft decisions so that they cannot exceed a certain value. For example, if 30 soft decisions of digital word value 10 were added together, the result would be a digital word of value 3000—a wide digital word. The Quantize block 404 may place a limit of digital word value 255 on soft decisions, and may clip any longer digital word soft decisions down to the desired bit width and value limit of 255. After adjusting the bit width of the soft decisions 424, the Quantize block 404 outputs these decisions as sequentially processed soft decisions 324. By adjusting the bit width of the soft decisions 424, the Quantize block 404 may reduce the amount of area needed in the IR Buffer 306 to store soft decisions.

The pipeline delay stages 410, 412 are used to delay the stream tag signal 322 ("STREAM") from the HS_RAT-E_CHANGE module 402, while the pipeline delay stage 414 is used to delay the end of transport indicator 328 ("EOP"). If, for example, the Quantize block 404 takes two clock cycles to process a soft decision, then the stream tag signal 322 corresponding to soft decision may be delayed two clock cycles in the pipeline delay stages 410, 412. The EOP 328 signal may be output one clock cycle after the last soft decision and therefore may be delayed one clock cycle in the pipeline delay stages 414 to keep pace with the last soft decision of the soft decisions 324. Thus, the pipeline delay stages 410, 412, 414 match the delay of the Quantize block 404 so that the STREAM 322 signals (and the EOP 328 signal for the last soft decision of the payload) arrive at the HSRM FIFO 406 at substantially the same time as the respective quantized soft decisions 324.

The SYNC GEN block 408 receives the end of payload indicator 328 ("EOP") from the HSRM FIFO 406 and the initialization pulse 320 ("INIT"). The SYNC GEN block 408 outputs a clock signal 416 to both the HS_RATE_CHANGE module 402 and the HSRM FIFO 406 to provide synchronization for these stages. The INIT 320 signal starts the clock signal 416 and the EOP 328 signal is fed back to the SYNC GEN block 408 to stop the clock signal 416 once the end of the payload has been reached.

The FIFO Buffer 406 ("HSRM FIFO") receives, and eventually outputs, the stream tag signal 322 ("STREAM"), the end of payload indicator 328 ("EOP"), the sequentially processed soft decisions 324 ("DATA"), the data valid value 326 ("VALID"). The sequentially processed soft decisions 324 are output one by one, in sequence. The HSRM FIFO 406 also receives the clock signal 416 (from the SYNC GEN block 408). The clock signal 416 from the SYNC GEN block 408 may control reading of information from the FIFO Buffer 406 by causing soft decisions 324, VALID 326, STREAM 322, and EOP 328 to be read from, or output from, the HSRM FIFO 406 on every other clock cycle. Providing information (e.g., soft decisions 324) on every other clock cycle provides appropriate pacing to match the processing time of the Combine Logic block 304 associated with the IR Buffer 306 of FIG. 4. In this way, the Combine Logic block 304 is given time to read a soft decision value out of the IR Buffer 306 before adding the soft decision value to a soft decision value received from the FIFO Buffer 406 and then placing the result back in the IR Buffer 306. Reading the various signals from the FIFO Buffer 406 on every other clock cycle may even out the potentially bursty and erratic timing of sequentially processed soft decisions 424, 324 from the Rate Change module 402 and Quantize block 404, respectively. The Second De-Ratematching module 310 may not in general be able to exercise tight control over when the soft decisions 318 arrive for processing by the Rate Change module 402. The FIFO Buffer 406 may in general provide tight control over how soft decisions are output from the module 310.

Figure 6:
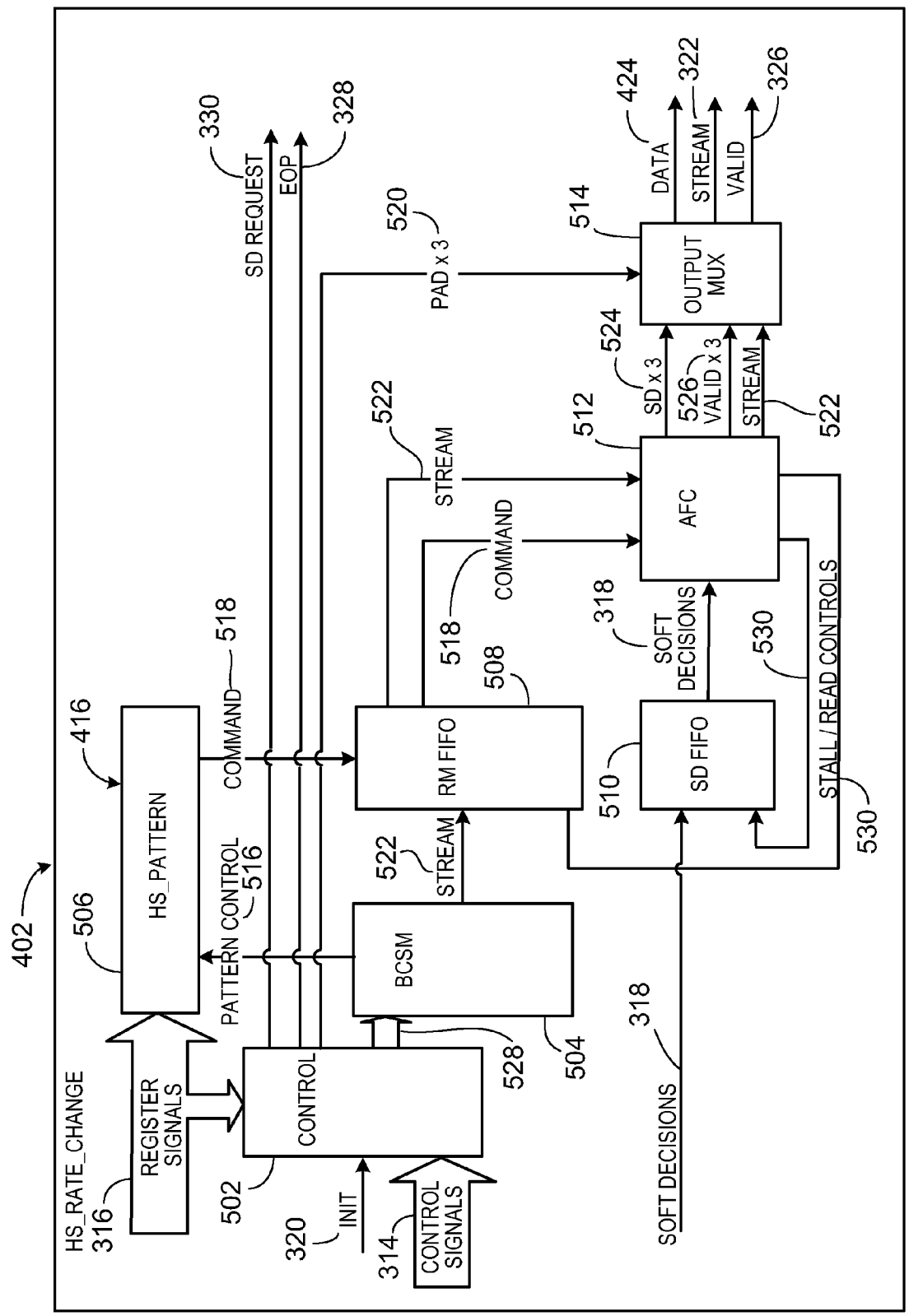
FIG. 6 is a block diagram of an example implementation of a module of a de-rate matching module.

FIG. 6 is a block diagram of an example implementation of the Rate Change module 402 ("HS_RATE_CHANGE") of FIG. 5. The implementation of module 402 may include a Control module 502 ("CONTROL"), a Bit Collection State Machine (BCSM) module 504 ("BCSM"), a Pattern module 506 ("HS_PATTERN"), a Rate Match FIFO Buffer 508 ("RM FIFO"), a Soft Decision FIFO Buffer 510 ("SD FIFO"), an Accumulation and FIFO Control Block 512 ("AFC"), and an Output Multiplexer 514 ("OUTPUT MUX").

Generally, the Rate Change module 402 receives the soft decisions 318 and the BCSM module 504 performs reverse bit collection using a bit collection table that is defined by certain software parameters to determine whether a soft decision 318 that has arrived should have been (based on the table information) a Systematic bit, a Parity 1 bit, or a Parity 2 bit. The BCSM Module 504 also builds the bit collection table in the RM FIFO 508. The Pattern module 506 determines whether a particular soft decision was rate matched or not. If the particular soft decision was not rate matched, the soft decision is passed through the AFC 512 and the Output MUX 514 and out of the Rate Change module 402. If bits were punctured from the payload that the soft decision was detected from (i.e., puncturing), and the soft decision was rate matched, then the AFC 512 will insert one or more zero soft decisions after the soft decision. If bits were repeated in the payload that the soft decision was detected from (i.e., repetition), and the soft decision was rate matched, then the AFC 512 will, e.g., add that soft decision together with any other consecutive repeated soft decisions for that data stream, Systematic, Parity 1, or Parity 2. After all of the soft decisions from the payload have arrived and the bit collection table has been constructed, if any deficit of Systematic, Parity 1, or Parity 2 bits exists, then, in an implementation, the deficit is met by padding the respective data streams with zero soft decisions at the Output MUX 514.

The Control module 502 receives the Control Signals 314, the Register Signals 316, and the initialization pulse 320 ("INIT"). The Control module 502 outputs bit collection control signals 528, the soft decision request value 330 ("SD REQUEST"), the end of payload or end of packet indicator 328 ("EOP"), and three parallel padding signals 520 ("PADx 3"), corresponding to the data streams Systematic, Parity 1, and Parity 2.

The BCSM module 504 receives the bit collection control signals 528 from the Control module 502, and outputs a stream tag signal 522 ("STREAM") and a pattern control signal 516 ("PATTERN CONTROL").

The Pattern module 506 ("HS_PATTERN") receives the pattern control signal 516 ("PATTERN CONTROL") from the BCSM module 504, and the Register Signals 316. HS_PATTERN 506 outputs a de-rate matching command signal 518 ("COMMAND").

The Control module 502, the BCSM module 504 and the Pattern module 506 do not receive the actual soft decisions 318. Rather, the modules 502, 504, 506 receive parameters set in hardware and software that may define, or that may be used by these modules 502, 504, or 506 to define, a bit collection table. These parameters may indicate which type of data stream a soft decision 318 that will be arriving for processing is part of, and whether the soft decision 318 was rate matched.

As described generally above, the transmitter 14 on the base station 12 sends control data to the mobile station 18. This control data may include, or may be used to generate, the Control Signals 314 and the Register Signals 316.

The Control Signals 314 may include information that is related to and that may potentially change with each particular payload sent by the transmitter, such as the type of modulation that is used, e.g., 16 QAM modulation or QPSK, and whether new data is being sent by the transmitter, for example. The Control Signals 316 may include parameters derived directly from hardware and based on information sent to the receiver 20 during set up of a data traffic channel between the base station 12 and the mobile station 18 over the wireless communication channel 24.

The Register Signals 316 may include high level information, such as information about a bit collection table corresponding to a particular payload, information regarding whether rate matching (i.e., puncturing or repeating) occurred with a particular payload. The Register Signals 316 may include parameters derived directly from and written by software on the receiver 20 and that may vary from payload to payload. The Register Signals 316 may include epsilon parameters and bit collection table parameters.

Table parameters received from the Register Signals 316 at the Control module 502 define the bit collection table and allow the Control module 502 (e.g., through generation of bit collection control signals 528) and the BCSM module 504 to determine whether a soft decision 318 that is going to arrive (at, e.g., the SD FIFO 510) for processing should have been a Systematic bit, a Parity 1 bit, or a Parity 2 bit. The BCSM module 504 cycles through various states of Systematic, Parity 1, and Parity 2, using the table parameters to create a stream tag signal 522 corresponding to soft decisions 318. In so doing, the BCSM module 504 reproduces the bit collection table. The stream tag signal 522 ("STREAM") may be a two bit value reflecting the state of the BCSM module 504, e.g., with a "00" value representing a Systematic data stream state, a "01" value representing a Parity 1 data stream state, a "10" value representing a Parity 2 data stream state, a "11" value indicating the end of soft decisions 318 detected for a particular payload. The BCSM module 504 may pause at a particular state while de-rate matching operations are performed by the AFC 512, such as accumulation (to reverse the effects of repeating), and insertion of zero soft decisions (to reverse the effects of puncturing).

The bit collection table parameters provided by the Register Signals 316 define the bit collection table and allow the BCSM module 504 to sequence through the different states of Systematic, Parity 1, and Parity 2. These parameters may include the parameters Nr, Nc, and Ncol. Nr represents the number of table rows having full rows of Systematic. If Nr is 2, for example, the first 2 rows of the bit collection table are full rows of Systematic. If Nr is 0, no rows in the table are full rows of Systematic. Nc represents the last column of Systematic in the row Nr+1, with Nr+1 being the first row not having all Systematic. Nc thus indicates where Systematic ends and where (possibly) Parity 1 begins. Ncol represents the number of columns in the bit collection table. Other parameters provide information about the bit collection table. A hardware parameter Nrow provided from the Control Signals 314 indicates the modulation mode (16 QAM or QPSK) as well as the number of rows in the bit collection table (i.e., 4 rows for 16 QAM and 2 rows for QPSK).

In some implementations, the BCSM module 504 may observe the following rules: the next Parity state after a Parity 1 state must be a Parity 2 state and the next Parity state after a Parity 2 state must be a Parity 1 state, and Systematic states may be followed by Systematic states. The following example sequences of soft decisions 318 (corresponding to bit collection states) are permitted (where data stream Systematic=S, Parity 1=P1, and Parity 2=P2): S, S, S, P1, S, S, S, P2, S, S and S, S, P1, P2, S, S, P1, P2.

Figure 7:
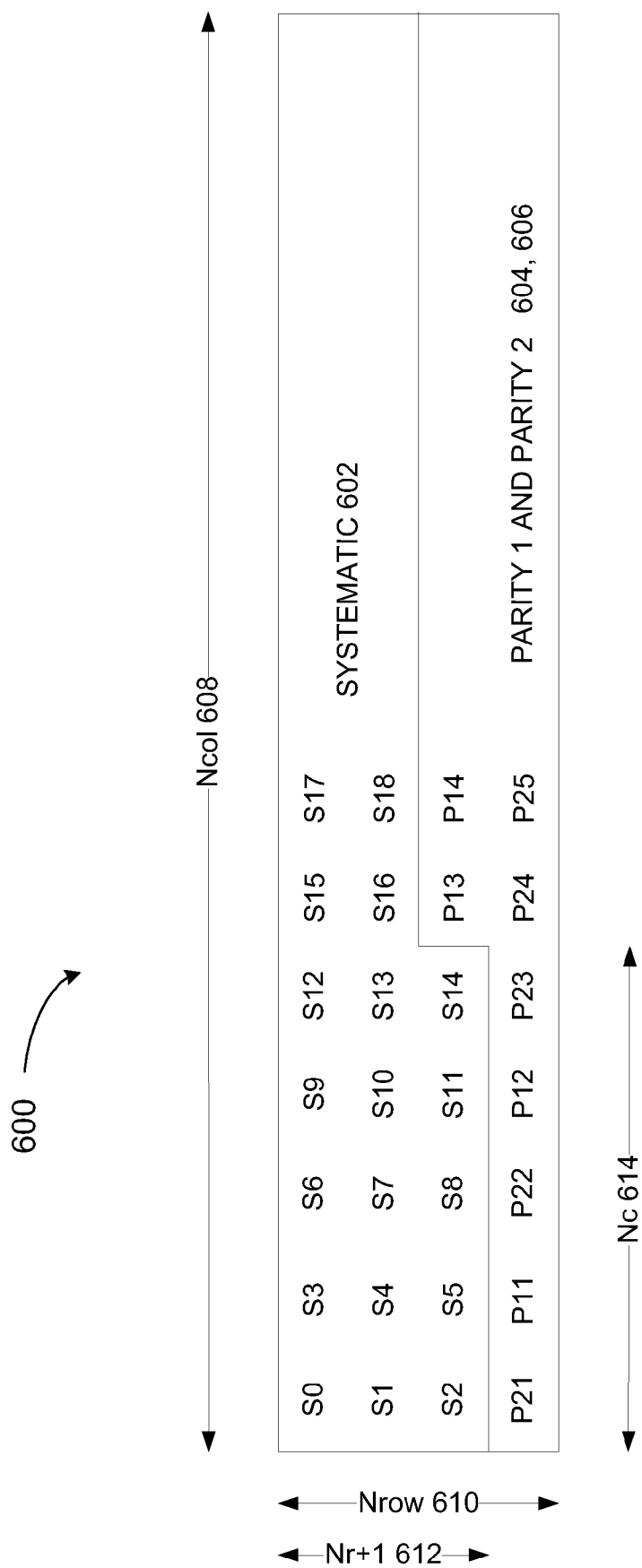
FIG. 7 is a diagram of an example bit collection table.

FIG. 7 is a diagram of an example bit collection table 600. Here, Nrow 610 is equal to 4, so the modulation mode is 16 QAM and the table 600 has four rows. Nr+1 612 is equal to 3, so Nr is equal to 2, the first 2 rows of the table 600 are full rows of Systematic, and the third row is the first row not having all Systematic. Ncol 608 is the number of columns in the table 600, while Nc 614 indicates where Systematic ends in the third row of the table 600.

Using the bit collection table 600 as an example, the soft decisions 318 arrive at the SD FIFO 510 in a sequence, with the sequence corresponding to moving through the table 600 from the first row and the first column (Systematic bit 0; S0) to the second row in the first column (Systematic bit 1, S1), to the third row in the first column (Systematic bit 2, S2), to the fourth row in the first column (Parity 2 bit 1, P21), to the first row in the second column (Systematic bit 3, S3), to the second row in the second column (Systematic bit 4, S4), to the third row in the second column (Systematic bit 5, S5), to the fourth row in the second column (Parity 1 bit 1, P11), and so on, until the fourth row in the last column (column Ncol). According to the example table 600, soft decisions 318 would arrive at the SD FIFO 510 in the following sequence (where data stream Systematic=S, Parity 1=P1, and Parity 2=P2): S, S, S, P2, S, S, S, P1, S, S, S, P2, S, S, S, P1, S, S, S, P2, S, S, P1, P2, S, S, P1, P2, and so on. These soft decisions 318 would correspond to the following bits in the table 600 being constructed by a bit collection state machine in the BCSM module 504: S0, S1, S2, P21, S3, S4, S5, P11, S6, S7, S8, P22, S9, S10, S11, P12, S12, S13, S14, P23, S15, S16, P13, P24, S17, S18, P14, P25. In this way, the BCSM module 504 cycles through various states of Systematic, Parity 1, and Parity 2, using the table parameters to create a stream tag signal 522 corresponding to soft decisions 318.

The initialization pulse 320 ("INIT") may initiate processing at the Control module 502, the BCSM module 504 and the Pattern module 506. The initialization pulse 320 may reset the BCSM module 504 to a "Reset" state. The pulse 320 may be used to initialize the epsilon parameters and the context switched epsilon calculator in the Pattern module 506, described in more detail below.

The Control module 502 may also include a row counter and a column counter to track the position(s) in the bit collection table for each soft decision 318 that is going to arrive (at, e.g., the SD FIFO 510) for processing and may use the row and column counters to provide bit collection control signals 528 to the BCSM module 504 so that the BCSM module 504 may cycle through the various data stream states and reproduce the bit collection table.

The Control module 502 may send the soft decision request value 330 ("SD REQUEST") to request more soft decisions as the BCSM module 504 recreates the bit collection table based on the table parameters received via the Register Signals 316.

The BCSM module 504 also outputs the pattern control signal 516 to inform the Pattern module 506 to which data stream a soft decision 318 that is going to arrive (at, e.g., the SD FIFO 510) for processing belongs. The Pattern module 506 uses epsilon parameters received from the Register Signals 316 to calculate whether a soft decision 318 arriving for processing was rate matched or not.

The epsilon parameters may include the EPSILON_INI, an EPSILON_PLUS, and an EPSILON_MINUS parameters, for each data stream type, e.g., Systematic, Parity 1 and Parity 2. The Pattern module 506 may implement a context switched epsilon calculator (not shown) that, based on an equation using the epsilon parameters, determines a current epsilon parameter result for each soft decision 318 that is going to arrive (at, e.g., the SD FIFO 510) for processing. If the value of the current epsilon parameter result corresponding to a particular soft decision 318 is negative or zero, the soft decision 318 was rate matched by the transmitter 14. If the value of the parameter result is positive, the soft decision 318 was not rate matched.

The context switched epsilon calculator may include a calculator that implements the equation, and three memories to store the last calculated value of the current epsilon parameter result for each respective data stream type, Systematic, Parity 1, and Parity 2. The pattern control signal 516 from the BCSM module 504 tells the Pattern module 506 whether the module 506 should perform the epsilon calculation for Systematic, Parity 1, or Parity 2. The pattern control signal 516 switches between the memories and the sets of epsilon parameters based on the data stream type to which the soft decision 318 belongs. For example, if the pattern control signal 516 indicates that the soft decision 318 is part of the Systematic data stream, then in determining the current epsilon parameter result for that soft decision 318, the epsilon calculator will draw the last calculated value of the current epsilon parameter result from the Systematic memory and calculate the equation using the EPSILON_PLUS and EPSILON_MINUS parameters for Systematic.

The equation for the current epsilon parameter result may include taking the last calculated value of the current epsilon parameter result for Systematic, and subtracting the EPSILON_MINUS parameter for Systematic to determine successive epsilon parameter results, until the current epsilon parameter result for Systematic becomes negative. At this point the equation may include adding the EPSILON_PLUS parameter for Systematic. In the case of a payload that had bits punctured from it, the EPSILON_PLUS parameter for Systematic is added once to determine the current epsilon parameter result (which may be positive). Then, the EPSILON_MINUS parameter for Systematic is subtracted from the current epsilon parameter result to determine successive epsilon parameter results, until the current epsilon parameter result once again becomes negative. In the case of a payload that included repeated bits, the EPSILON_PLUS parameter for Systematic is added to determine successive epsilon parameter results until the current epsilon parameter result becomes positive, at which time the EPSILON_MINUS parameter for Systematic is subtracted from the positive current epsilon parameter result to determine successive epsilon parameter results until the current epsilon parameter result once again becomes negative. Equations for the Parity 1 and Parity 2 soft decisions 318 may be implemented in a like manner.

Release 5 of the 3GPP Standard, incorporated herein by reference, describes these functions in more detail. Determination of the initial values of the epsilon parameters for each data stream is described in Section 4.5.4.3 of 3G WCDMA standard 3GPP TS 25.212 Version 5.10.0 Release 5: "Multiplexing and Channel Coding (FDD)", June 2005, pp. 55-56. Determination of the current epsilon parameter result for each of the data streams is described in Sections 4.2.7.5 and 4.5.4.3 of the 3G WCDMA standard, June 2005, pp. 37-38 and 55-56.

Based on the current epsilon parameter result, the Pattern module 506 determines the de-rate matching command signal 518 ("COMMAND"), which may take on values as described below, based on whether a corresponding soft decision 318 was rate matched and the type of rate matching used (if any) in the particular payload from which the soft decision 318 was detected. Each successive de-rate matching command signal 518 value for each successive corresponding soft decision 318 is stored in the RM FIFO 508 along with a corresponding stream tag signal 522 value from the BCSM module 504 as described below.

The context switched epsilon calculator may be initialized (in response to, e.g., the INIT pulse 320) by calculating the equation for each data stream using the respective EPSILON_INI value in place of the last calculated value of the current epsilon parameter result.

The Pattern module 506 may be synchronized by the clock signal 416 from the SYNC GEN block 408 of FIG. 5.

The Control module 502 may include data stream counters for each data stream type. The counters may be initialized with the expected number of bits of each data stream type (e.g., derived from the epsilon parameters from the Register Signals 316). The counters may be decremented as respective soft decisions 318 of the respective data stream types are requested by the Control module 502, and as the Control module 502 and the BCSM 504 determine whether a soft decision 318 that is going to arrive (at, e.g., the SD FIFO 510) for processing should have been a Systematic bit, a Parity 1 bit, or a Parity 2 bit. The size of the bit collection table reproduced by the BCSM 504 is equivalent to the number of bits that the base station 12 finally transmits over the wireless communications channel 24 in the payload. The bit collection table size matches the number of soft decisions detected in the payload at the receiver 20. When a particular payload has been punctured at the transmitter, the number of soft decisions that may need to be stored in the IR Buffer 306 may exceed the number of bits actually sent by the transmitter 14 in the payload. That is, the expected number of bits of each data stream type (used to initialize the counters in the Control module 502) may exceed the number of bits actually sent by the transmitter 14 in the payload. Therefore, when the bit collection table is completed by the BCSM module 504 and the stream tag signal 522 value from the BCSM module indicates the end of soft decisions 318 detected for a particular payload (e.g., "11"), the remaining values of the counters in the Control module 502 may indicate deficits in the respective data streams, Systematic, Parity 1, and Parity 2. These deficits may be replaced using a padding operation by the Output MUX 514 to insert zero soft decisions following the sequentially processed soft decisions 524. The Control module 502 uses the three parallel padding signals 520 ("PAD×3"), corresponding to the data streams Systematic, Parity 1, and Parity 2, to control the Output MUX 514 during a padding operation, as described below. When all three of the data stream counters reach zero, following either the end of the bit collection table or, if necessary, a subsequent padding operation, the Control module 502 outputs the end of payload or end of packet indicator 328 ("EOP").

The Rate Match FIFO Buffer 508 ("RM FIFO") receives the stream tag signal 522 ("STREAM") from the BCSM module 504, the de-rate matching command signal 518 ("COMMAND") from the Pattern module 506, and the stall/read controls 530 ("STALL/READ CONTROLS") from the Accumulation and FIFO Control Block 512 ("AFC"). The RM FIFO 508 outputs the stream tag signal 522 and the command signal 518 to the AFC 512.

The Soft Decision FIFO Buffer 510 ("SD FIFO") receives the soft decisions 318, one by one, in sequence. The SD FIFO 510 also receives the stall/read controls 530 from the AFC 512. The SD FIFO 510 outputs the soft decisions 318 to the AFC 512.

The Accumulation and FIFO Control Block 512 ("AFC") receives the stream tag signal 522 and the command signal 518 from the RM FIFO 508 as well as the soft decisions 318 from the SD FIFO 510. The AFC 512 outputs the stall/read controls 530 to the RM FIFO 508 and the SD FIFO 510. The AFC 512 outputs the stream tag signal 522, three parallel data streams of soft decisions 524 ("SD×3"), and three corresponding parallel data valid values 526 ("VALID×3"), corresponding to the data streams Systematic, Parity 1, and Parity 2.

During operation, values of the stream tag signal 522 ("STREAM") from the BCSM module 504 and values of the de-rate matching command signal 518 ("COMMAND") from the Pattern module 506 are stored in the RM FIFO 508. The RM FIFO 508 may include sufficient capacity to store STREAM 522 and COMMAND 518 values to account for delays present in the system. For example, the RM FIFO 508 may have capacity for, e.g., 16 pairs of STREAM 522 and COMMAND 518 values before filling up. In general, a command signal 518 value and a stream tag signal 522 value are generated for every soft decision 318 in a payload. The de-rate matching command signal 518 values may be generated until the RM FIFO 508 is full, at which point the Pattern module 506 may pause until additional space opens up in the RM FIFO 508.

The soft decisions 318 arriving at the SD FIFO 510 (in response to SD REQUESTS 330 sent by the Control module 502) may generally drive and set the pacing of processing in the AFC 512. The command signal 518 values and the stream tag signal 522 values generally wait in storage for soft decisions 318 to arrive.

The AFC 512 may manage transfer of data 518, 522, 518 from the SD and RM FIFOs 510, 508 using the stall/read controls 530. The AFC 512 may request a soft decision 318 from the SD FIFO 510 and a de-rate matching command signal 518 value and a stream tag signal 522 value from the RM FIFO 510 using the read control 530. The AFC 512, using the stall control 530, may hold soft decisions 318 at the SD FIFO 510 while processing occurs at the AFC 512. The two FIFOs, the SD FIFO 510 and the RM FIFO 508 allow the AFC 512 to manage transfer of data 518, 522, 518 in an environment where the soft decisions 318 are input to the SD FIFO 510 at generally a different rate and time than the signals 518, 522 are input to the RM FIFO 508.

As soft decisions 318 are received at the SD FIFO 510, one by one, in sequence, the AFC 512 reads a command signal 518 value and a stream tag signal 522 value out of the RM FIFO 510 and matches these values with a soft decision 318 read from the SD FIFO 510.

The de-rate matching command signal 518 ("COMMAND") may be a two bit value configured to be in one of three states (e.g., "01", "10", "11", or the like, with "00" not being a valid state).

In a first state (e.g., "11"), in generating the de-rate matching command signal 518, the Pattern module 506 determined that the soft decision 318 (that corresponds to the command signal 518 value) was not rate matched. Therefore, upon applying a command 518 value that is in this first state, the AFC 512 is in "pass through" mode, and will not perform an accumulation operation or an insertion operation for that soft decision 318, and the soft decision 318 will be passed through the AFC 512 to the Output MUX 514 with no rate de-matching. In addition, in response to the command signal 518 value, the AFC 512 requests another soft decision 318 from the SD FIFO 510 (and then another command signal 518 value and stream tag signal 522 value out of the RM FIFO 510).

In a second state (e.g., "01"), in generating the de-rate matching command signal 518, the Pattern module 506 learned that the payload (that included the soft decision 318 that corresponds to the command signal 518 value) was punctured, and the module 506 determined that the soft decision 318 was rate matched. Therefore, upon applying a command 518 value that is in this second state, the AFC 512 is in puncturing mode, and, will insert one zero soft decision following the soft decision 318. So that soft decisions 318 do not arrive during insertion of the zero soft decision(s) in puncturing mode, the AFC 512 uses the stall control 530 to hold soft decisions 318 at the SD FIFO 510 (and command signals 518 and the stream tag signal 522 at the RM FIFO 508) until the puncturing mode ends. Repeated iterations of the second state will result in a corresponding number of inserted zero soft decisions.

In a third state (e.g., "10"), in generating the de-rate matching command signal 518, the Pattern module 506 learned that the payload (that included the soft decision 318 that corresponds to the command signal 518 value) included repeated bits, or had repetition, and the module 506 determined that the soft decision 318 was rate matched. Therefore, upon applying a command 518 value that is in this third state, the AFC 512 is in repetition mode, and will accumulate repeated soft decisions 318. In addition, in response to the command signal 518 value, the AFC 512 requests another soft decision 318 from the SD FIFO 510 (and then another command signal 518 value and stream tag signal 522 value out of the RM FIFO 510). In repetition mode, the AFC 512 may accumulate repeated soft decisions 318 by adding soft decisions together, which generally may increase the bit width of the resulting soft decision. The AFC 512 may be implemented as a single accumulator (e.g., an adder), with the stream tag signal 522 value (Systematic, Parity 1, or Parity 2) selecting a corresponding memory to use with the accumulator. The AFC 512 may alternatively be implemented as three parallel accumulators, with the stream tag signal 522 value selecting the accumulator to be used. In this way, the AFC 512 outputs the stream tag signal 522, three parallel data streams of soft decisions 524 ("SD×3"), and three corresponding parallel data valid values 526 ("VALID×3"), corresponding to the data streams Systematic, Parity 1, and Parity 2.

Since soft decisions 318 may move into and out of the SD FIFO 510 in any order, in sequence, a single accumulator may include memory to store results of accumulation while the AFC 512 waits to receive further repeated soft decisions 318 corresponding to the data stream of the rate matched soft decision. For example, the transmitter 14 at the base station 12 may have repeated 6 Parity 2 bits in a row in a payload, but the soft decisions 318 representing these Parity 2 bits may arrive interspersed with soft decisions 318 representing Systematic and Parity 1. With parallel memories corresponding to each data stream, the AFC 512 may avoid overwriting of soft decisions 318 and may wait for all of the 6 soft decisions 318 representing these Parity 2 bits to arrive and be processed by the accumulator before outputting the final accumulated soft decision 524 for the soft decisions 318 representing the 6 repeated Parity 2 bits.

The AFC 512 may employ averaging techniques, rather than solely addition techniques, in repetition mode.

The Output MUX 514 ("OUTPUT MUX") receives the stream tag signal 322 ("STREAM"), the three parallel data streams of soft decisions 524 ("SD×3"), and the three corresponding parallel data valid values 526 ("VALID×3") from the AFC 512. The Output MUX 514 also receives the three parallel padding signals 520 ("PAD×3") from the Control module 502. The Output MUX 514 outputs the stream tag signal 322 ("STREAM"), the sequentially processed soft decisions 424 ("DATA"), and the data valid value 326 ("VALID"). The Outpux MUX 514 may implement OR logic to multiplex the three parallel data streams of soft decisions 524 and the three parallel data valid values 526 down to a single output of sequentially processed soft decisions 424 and a single output of the data valid value 326 (with corresponding stream tag signal 322). The sequentially processed soft decisions 424 are output one by one, in sequence and are provided to the Quantize block 404 of FIG. 5.

As described above, the stream tag signal 322 may take on, e.g., four values, a value indicating Systematic (e.g., "00"), a value indicating Parity 1 (e.g., "01"), a value indicating Parity 2 (e.g., "10"), and a value indicating the end of soft decisions 318 detected for a particular payload (e.g., "11"). The last value may be used to mark the end of a bit collection table constructed by the BCSM module 504 into the RM FIFO 508, and may mark the beginning of a padding operation by the Output MUX 514.

Just before a padding operation begins, the bit collection table may be completed, all soft decisions 318 may have been processed, the RM FIFO 508 and the SD FIFO 510 may no longer hold data 318, 518, 522, and the BCSM module 504 and the Pattern module 506 may shut down. With a padding operation, the Control module 502 has counted down the bits for the respective streams of soft decisions 318 in its data stream counters and is aware of any deficits in the respective data streams, Systematic, Parity 1, and Parity 2 based on remaining values of the data stream counters. For example, the payload may intend to send data that, in its full form, is 9,000 bits, with 3,000 bits of Systematic, 3,000 bits of Parity 1, and 3,000 bits of Parity 2. Parity 1 and Parity 2 are redundancy created at the transmitter 14 to improve the chances of the receiver 20 receiving the correct bits. The transmitter 14 may send payloads with subsets of these 9,000 bits, in any combination of Systematic, Parity 1, and Parity 2. For example, the transmitter 14 may encode a particular payload to include 1,500 bits of Systematic (half of the 3,000 Systematic bits) and no Parity 1 or Parity 2. In general, the decoder on the receiver 20 may not work properly unless the three data streams of soft decisions received at the decoder are each of equal length. Thus, according to the example, the decoder on the receiver 20 needs to receive soft decisions of an equal number for each data stream, in this case 9,000 total soft decisions representing 3,000 bits of Systematic, 3,000 bits of Parity 1, and 3,000 bits of Parity 2. In this example, the BCSM module 504, the Pattern module 506, the RM FIFO 508, and the SD FIFO 510, and AFC 512 will only process and store 1,500 soft decisions of Systematic corresponding to the received payload (or generate and store signals corresponding to the 1,500 soft decisions of Systematic). Therefore, padding may generally be needed to add in the 1,500 remaining Systematic soft decisions, the 3,000 Parity 1 soft decisions, and the 3,000 Parity 2 soft decisions.

The Control module 502 outputs the three parallel padding signals 520 ("PAD×3") to the Output MUX 514. The padding signal for a first data stream that needs padding may go active, causing logic implemented at the Output MUX 514 to generate a stream tag signal 322 ("STREAM") value corresponding to that data stream. In padding, the data valid value 326 ("VALID") is driven active to indicate valid data, and the sequentially processed soft decisions 424 ("DATA") are driven low so that "zero" soft decisions are output. In this way, the Output MUX 514 "pads" the sequence of soft decisions to arrive at the desired number of soft decisions.

Continuing with the prior example above (i.e., the payload of 1,500 Systematic bits), the Control module 502 outputs the three parallel padding signals 520 ("PAD×3") to the Output MUX 514 after the 1,500 soft decisions 318 of Systematic have been processed. The PAD signal corresponding to the Systematic data stream will go active for padding of 1,500 zero soft decisions of the Systematic data type. Next, the PAD signal corresponding to the Parity 1 data stream will go active for padding of 3,000 zero soft decisions of the Parity 1 data type. Finally, the PAD signal corresponding to the Parity 2 data stream will go active for padding of 3,000 zero soft decisions of the Parity 2 data type. The full set of sequentially processed soft decisions 424 ("DATA"), including any zero soft decisions inserted during padding, are input one by one, in sequence, to the Quantize block 404 of FIG. 5 and processing continues as described above with respect to FIG. 5 and FIG. 4.

For certain received payloads, no padding by the Output MUX 514 may be necessary, as all data streams having the appropriate number of bits may be sent in the payload.

Figure 8:
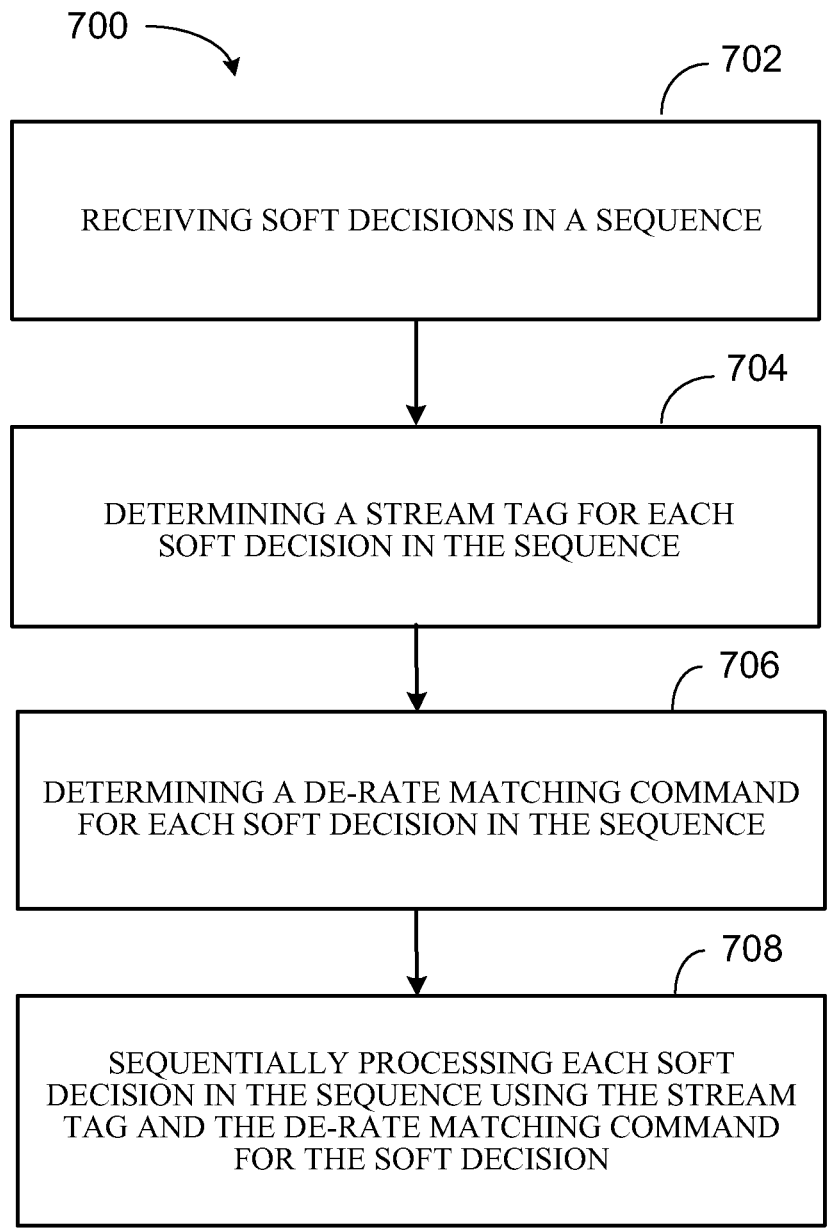
FIG. 8 is a flow diagram showing an example process of a mobile station implementing de-rate matching.

FIG. 8 is a flow diagram showing an example process 700 of a mobile station such as the mobile station 18 of FIG. 1, as relates to implementing de-rate matching of soft decisions. The mobile station 18 may include, e.g., the example implementations shown in FIGS. 4, 5 and 6.

Processing begins (702), for example, when soft decisions are received (702) in a sequence. As described above, in an implementation, the Second De-Rate Matching module 310 of FIG. 4 may receive soft decisions 318 one by one, in sequence. The Rate Change module 402 of FIG. 5 may receive the soft decisions 318 one by one, in sequence and the soft decisions may be stored in an input register (not shown) prior to being received at the module 402. The SD FIFO 510 of FIG. 6 may receive the soft decisions 318, one by one, in sequence.

A stream tag for each soft decision in the sequence is determined (704). As described above, in an implementation, the BCSM module 504 of FIG. 6 may determine a stream tag signal 522 ("STREAM"). Table parameters from the Register Signals 316 at the Control module 502 may define the bit collection table and allow the Control module 502 (e.g., through generation of bit collection control signals 528) and the BCSM module 504 to determine whether a soft decision 318 that is going to arrive (at, e.g., the SD FIFO 510) for processing should have been a Systematic bit, a Parity 1 bit, or a Parity 2 bit. The BCSM module 504 cycles through various states of Systematic, Parity 1, and Parity 2, using the table parameters to create a stream tag signal 522 corresponding to soft decisions 318. Each value of the stream tag signal 522 corresponds to a respective soft decision 318 in the sequence.

A de-rate matching command for each soft decision in the sequence is determined (706). As described above, in an implementation, the Pattern module 506 of FIG. 6 determines the de-rate matching command signal 518 ("COMMAND"), which may take on values as described above, based on whether a corresponding soft decision 318 was rate matched and the type of rate matching used (if any) in the particular payload from which the soft decision 318 was detected. As described above, each successive de-rate matching command signal 518 value for each successive corresponding soft decision 318 is stored in the RM FIFO 508 of FIG. 6 along with a corresponding stream tag signal 522 value from the BCSM module 504.

Each soft decision 318 in the sequence is sequentially processed (708) using the stream tag and the de-rate matching command for the soft decision. As described above, in an implementation, as soft decisions 318 are received at the SD FIFO 510, one by one, in sequence, the Accumulation and FIFO Control Block 512 ("AFC") of FIG. 6 reads the de-rate matching command signal 518 value and the stream tag signal 522 value out of the RM FIFO 510 and matches these values with a soft decision 318 read from the SD FIFO 510. As described in more detail above, the AFC 512 may sequentially process the soft decisions 318 using command signal 517 and stream tag signal 522 values. The sequential processing may include passing non-rate matched soft decisions 318 through, inserting one or more zero soft decisions, and, e.g., adding a rate matched soft decision 318 (detected from a payload in which bits repeated) together with any other consecutive repeated soft decisions 318 for a data stream. In some implementations, sequential processing may include padding of respective data streams with zero soft decisions at the Output MUX 514, as described above.

Connections may be wired or wireless connections. When one component is said to be connected to another component, the component may be directly connected or indirectly connected (via, e.g., still another component) to the other component.

The processes described herein are not limited to use with any particular hardware, software, or programming language; they may find applicability in any computing or processing environment and with any type of machine that is capable of running machine-readable instructions. All or part of the processes can be implemented in digital electronic circuitry, or in computer hardware, firmware, software, or in combinations thereof.

The processes described herein and their various modifications (hereinafter "the processes"), are not limited to the hardware and software described above. All or part of the processes can be implemented, at least in part, via a computer program product, e.g., a computer program tangibly embodied in an information carrier, such as one or more machine-readable media or a propagated signal, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the processes can be performed by one or more programmable processing devices executing one or more computer programs to perform the functions of the processes. All or part of the processes can be implemented as, special purpose logic circuitry, e.g., an FPGA (field programmable gate array) and/or an ASIC (application-specific integrated circuit).

Processing devices suitable for the execution of a computer program include, by way of example, both general and special purpose microprocessors, and any one or more processors of any kind of digital computer. Generally, a processing device will receive instructions and data from a read-only memory or a random access memory or both. Components of a computer include one or more processing devices for executing instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

Components of different implementations described herein may be combined to form implementations not specifically set forth above. Other implementations not specifically described are also within the scope of the following claims.

What is claimed is:

1. A method of implementing de-rate matching of soft decisions, the method being performed by a mobile station in a wireless network, the method comprising:
    receiving the soft decisions in a sequence;
    determining a stream tag for each soft decision in the sequence;
    determining a de-rate matching command for each soft decision in the sequence; and
    sequentially processing each soft decision in the sequence using the stream tag and the de-rate matching command for the soft decision, the sequence including soft decisions that are associated with different stream tags;
    determining, for each of N types of data streams, N being an integer, a padding command, the padding command being indicative of whether the type of data stream requires padding; and
    if one or more of the N types of data streams requires padding, inserting one or more soft decisions of value zero after the soft decisions in the sequence have been sequentially processed;
    wherein each soft decision in the sequence is part of one type of the N types of data streams, and
    wherein the stream tag can have one of N values and the stream tag identifies, for each soft decision in the sequence, which type of the N types of data streams the soft decision is part of.

2. The method of claim 1, further comprising:
    detecting the soft decisions from a payload, the payload being sent from a base station in the wireless network and being received at the mobile station.

3. The method of claim 2, further comprising:
    pre-processing the soft decisions detected from the payload to put the soft decisions in a format for de-rate matching.

4. The method of claim 1, wherein the de-rate matching command indicates, for each soft decision in the sequence, at least one of whether a bit following a bit represented by the soft decision was punctured or whether the bit represented by the soft decision was repeated.

5. The method of claim 1, wherein sequentially processing each soft decision in the sequence comprises:
    if the de-rate matching command indicates that a bit following a bit represented by the soft decision was punctured, inserting one or more additional soft decisions after the soft decision, the one or more additional soft decisions being of value zero.

6. The method of claim 1, wherein sequentially processing each soft decision in the sequence comprises:
    if the de-rate matching command indicates that a bit represented by the soft decision was repeated, combining the soft decision with one or more subsequent soft decisions received in the sequence to form a combined soft decision, the one or more subsequent soft decisions sharing the same stream tag as the soft decision.

7. The method of claim 6, wherein combining the soft decision comprises:
    combining the soft decision with a first subsequent soft decision of the one or more subsequent soft decisions to form a first combined soft decision, the soft decision being part of one type of data stream as identified by the stream tag;
    processing another soft decision, the another soft decision being part of another type of data stream as identified by another stream tag;
    storing the first combined soft decision in a memory while processing the another soft decision; and
    combining the first combined soft decision with remaining soft decisions of the one or more subsequent soft decisions to form the combined soft decision.

8. The method of claim 6, further comprising:
    reducing a bit width of the combined soft decision.

9. The method of claim 1, wherein one of the N types of data streams is derived from another one of the N types of data streams.

10. The method of claim 1, wherein N is equal to 3, the N types of data streams comprise a systematic type, a parity one type, and a parity two type, and if the soft decision is part of the systematic type, the stream tag identifies the soft decision as part of the systematic type, if the soft decision is part of the parity one type, the stream tag identifies the soft decision as part of the parity one type, and if the soft decision is part of the parity two type, the stream tag identifies the soft decision as part of the parity two type.

11. The method of claim 1, further comprising:
for each soft decision in the sequence that has been sequentially processed,
generating a memory address for the soft decision using the stream tag, the memory address identifying a location in a buffer; and
transferring the soft decision to the buffer at the location.

12. The method of claim 11, further comprising:
storing the soft decisions in the sequence in parallel in the buffer, wherein storing the soft decisions comprises:
storing all soft decisions in the sequence having a first value of the N values of the stream tag in a first set of locations; and
storing all soft decisions in the sequence having an N-th value of the N values of the stream tag in an N-th set of locations, the N-th set of locations being separate from the first set of locations.

13. The method of claim 1, further comprising:
for each soft decision in the sequence,
storing the stream tag and the de-rate matching command in a first buffer;
storing the soft decision in a second buffer; and
wherein sequentially processing each soft decision in the sequence using the stream tag and the de-rate matching command for the soft decision comprises:
retrieving the stream tag and the de-rate matching command from the first buffer and retrieving the soft decision from the second buffer at substantially the same time.

14. The method of claim 1, wherein each soft decision in the sequence is representative of a bit value.

15. The method of claim 1, wherein determining the stream tag comprises:
determining the stream tag for each soft decision in the sequence using bit collection table parameters.

16. The method of claim 1, wherein determining the de-rate matching command comprises:
determining the de-rate matching command for each soft decision in the sequence using epsilon parameters.

17. The method of claim 16, wherein the epsilon parameters comprise an initial epsilon parameter, an epsilon plus parameter, and an epsilon minus parameter.

18. The method of claim 1, wherein the mobile station performs the method as part of implementing hybrid automatic repeat-request (HARQ) processing functions.

19. The method of claim 1 in which receiving the soft decisions in a sequence comprises receiving a sequence of soft decisions that include systematic bits, parity 1 bits, and parity 2 bits, and wherein sequentially processing each soft decision in the sequence comprises sequentially processing the sequence of soft decisions that include the systematic bits, the parity 1 bits, and the parity 2 bits.

20. A mobile station in a wireless network, comprising:
a de-rate matching module, the de-rate matching module being configured to de-rate match soft decisions received in a sequence, the de-rate matching module comprising:
a bit collection module configured to determine a stream tag for each soft decision in the sequence;
a pattern generator configured to determine a de-rate matching command for each soft decision in the sequence;
one or more logical blocks configured to sequentially process each soft decision in the sequence using the stream tag and the de-rate matching command for the soft decision, the sequence including soft decisions that are associated with different stream tags;
a control module configured to determine, for each of N types of data streams, N being an integer, a padding command, the padding command being indicative of whether the type of data stream requires padding; and
an output multiplexer configured to, if one or more of the N types of data streams requires padding, insert one or more soft decisions of value zero after the soft decisions in the sequence have been sequentially processed;
wherein each soft decision in the sequence is part of one type of the N types of data streams, and wherein the stream tag can have one of N values and the stream tag identifies, for each soft decision in the sequence, which type of the N types of data streams the soft decision is part of.

21. The mobile station of claim 20, further comprising:
a detector configured to detect the soft decisions from a payload, the payload being sent from a base station in the wireless network and being received at the mobile station.

22. The mobile station of claim 21, further comprising:
a pre-processing module configured to pre-process the soft decisions detected from the payload to put the soft decisions in a format for de-rate matching.

23. The mobile station of claim 20, wherein the de-rate matching command indicates, for each soft decision in the sequence, at least one of whether a bit following a bit represented by the soft decision was punctured or whether the bit represented by the soft decision was repeated.

24. The mobile station of claim 20, wherein the one or more logical blocks are configured to sequentially process each soft decision in the sequence by, if the de-rate matching command indicates that a bit following a bit represented by the soft decision was punctured, inserting one or more additional soft decisions after the soft decision, the one or more additional soft decisions being of value zero.

25. The mobile station of claim 20, wherein the one or more logical blocks are configured to sequentially process each soft decision in the sequence by, if the de-rate matching command indicates that a bit represented by the soft decision was repeated, combining the soft decision with one or more subsequent soft decisions received in the sequence to form a combined soft decision, the one or more subsequent soft decisions sharing the same stream tag as the soft decision.

26. The mobile station of claim 25, wherein the de-rate matching module further comprises:
a quantizer configured to reduce a bit width of the combined soft decision.

27. The mobile station of claim 20, wherein the one or more logical blocks comprise a memory, and the one or more logical blocks are configured to sequentially process each soft decision in the sequence by:
if the de-rate matching command indicates that a bit represented by the soft decision was repeated:
combining the soft decision with a first subsequent soft decision received in the sequence to form a first combined soft decision, the soft decision being part of one type of data stream as identified by the stream tag;
processing another soft decision, the another soft decision being part of another type of data stream as identified by another stream tag;
storing the first combined soft decision in the memory while processing the another soft decision; and
combining the first combined soft decision with one or more subsequent soft decisions received in the sequence to form a combined soft decision.

28. The mobile station of claim 20, wherein one of the N types of data streams is derived from another one of the N types of data streams.

29. The mobile station of claim 20, wherein N is equal to 3, the N types of data streams comprise a systematic type, a parity one type, and a parity two type, and if the soft decision is part of the systematic type, the stream tag identifies the soft decision as part of the systematic type, if the soft decision is part of the parity one type, the stream tag identifies the soft decision as part of the parity one type, and if the soft decision is part of the parity two type, the stream tag identifies the soft decision as part of the parity two type.

30. The mobile station of claim 20, further comprising:
a buffer;
an address generator configured to, for each soft decision in the sequence that has been sequentially processed, generate a memory address for the soft decision using the stream tag, the memory address identifying a location in the buffer; and
combine logic configured to transfer the soft decision to the buffer at the location.

31. The mobile station of claim 30, wherein the buffer is configured to store the soft decisions in the sequence in parallel by:
storing all soft decisions in the sequence having a first value of the N values of the stream tag in a first set of locations; and
storing all soft decisions in the sequence having an N-th value of the N values of the stream tag in an N-th set of locations, the N-th set of locations being separate from the first set of locations.

32. The mobile station of claim 20, wherein the de-rate matching module further comprises:
a first buffer configured to store, for each soft decision in the sequence, the stream tag and the de-rate matching command;
a second buffer configured to store, for each soft decision in the sequence, the soft decision;
wherein the one or more logical blocks are further configured to retrieve the stream tag and the de-rate matching command from the first buffer and retrieve the soft decision from the second buffer at substantially the same time.

33. The mobile station of claim 20, wherein each soft decision in the sequence is representative of a bit value.

34. The mobile station of claim 20, wherein the bit collection module is configured to determine the stream tag for each decision in the sequence by using bit collection table parameters.

35. The mobile station of claim 20, wherein the pattern generator is configured to determine the de-rate matching command for each soft decision in the sequence by using epsilon parameters.

36. The mobile station of claim 35, wherein the epsilon parameters comprise an initial epsilon parameter, an epsilon plus parameter, and an epsilon minus parameter.

37. The mobile station of claim 20, wherein the de-rate matching module is configured to de-rate match soft decisions as part of implementing hybrid automatic repeat-request (HARQ) processing functions.

38. A method of implementing de-rate matching of soft decisions, the method being performed by a mobile station in a wireless network, the method comprising:
receiving the soft decisions in a sequence;
determining a stream tag for each soft decision in the sequence;
determining a de-rate matching command for each soft decision in the sequence;
sequentially processing each soft decision in the sequence using the stream tag and the de-rate matching command for the soft decision, the sequence including soft decisions that are associated with different stream tags; and
for each soft decision in the sequence,
storing the stream tag and the de-rate matching command in a first buffer;
storing the soft decision in a second buffer;
wherein sequentially processing each soft decision in the sequence using the stream tag and the de-rate matching command for the soft decision comprises:
retrieving the stream tag and the de-rate matching command from the first buffer and retrieving the soft decision from the second buffer at substantially the same time.

39. The method of claim 38, further comprising:
detecting the soft decisions from a payload, the payload being sent from a base station in the wireless network and being received at the mobile station.

40. The method of claim 39, further comprising:
pre-processing the soft decisions detected from the payload to put the soft decisions in a format for de-rate matching.

41. The method of claim 38, wherein the de-rate matching command indicates, for each soft decision in the sequence, at least one of whether a bit following a bit represented by the soft decision was punctured or whether the bit represented by the soft decision was repeated.

42. The method of claim 38, wherein sequentially processing each soft decision in the sequence comprises:
if the de-rate matching command indicates that a bit following a bit represented by the soft decision was punctured, inserting one or more additional soft decisions after the soft decision, the one or more additional soft decisions being of value zero.

43. The method of claim 38, wherein sequentially processing each soft decision in the sequence comprises:
if the de-rate matching command indicates that a bit represented by the soft decision was repeated, combining the soft decision with one or more subsequent soft decisions received in the sequence to form a combined soft decision, the one or more subsequent soft decisions sharing the same stream tag as the soft decision.

44. The method of claim 43, further comprising:
reducing a bit width of the combined soft decision.

45. The method of claim 38, wherein each soft decision in the sequence is part of one type of N types of data streams, wherein N is an integer, and wherein the stream tag can have one of N values and the stream tag identifies, for each soft decision in the sequence, which type of the N types of data streams the soft decision is part of.

46. The method of claim 45, wherein one of the N types of data streams is derived from another one of the N types of data streams.

47. The method of claim 45, wherein N is equal to 3, the N types of data streams comprise a systematic type, a parity one type, and a parity two type, and if the soft decision is part of the systematic type, the stream tag identifies the soft decision as part of the systematic type, if the soft decision is part of the parity one type, the stream tag identifies the soft decision as part of the parity one type, and if the soft decision is part of the parity two type, the stream tag identifies the soft decision as part of the parity two type.

48. The method of claim 45, further comprising:
for each soft decision in the sequence that has been sequentially processed,
generating a memory address for the soft decision using the stream tag, the memory address identifying a location in a buffer; and
transferring the soft decision to the buffer at the location.

49. The method of claim 38, wherein each soft decision in the sequence is representative of a bit value.

50. The method of claim 38, wherein determining the stream tag comprises:
determining the stream tag for each soft decision in the sequence using bit collection table parameters.

51. The method of claim 38, wherein the mobile station performs the method as part of implementing hybrid automatic repeat-request (HARQ) processing functions.

52. A method of implementing de-rate matching of soft decisions, the method being performed by a mobile station in a wireless network, the method comprising:
receiving the soft decisions in a sequence;
determining a stream tag for each soft decision in the sequence;
determining a de-rate matching command for each soft decision in the sequence; and
sequentially processing each soft decision in the sequence using the stream tag and the de-rate matching command for the soft decision, the sequence including soft decisions that are associated with different stream tags;
wherein determining the de-rate matching command comprises:
determining the de-rate matching command for each soft decision in the sequence using epsilon parameters.

53. The method of claim 52, wherein the epsilon parameters comprise an initial epsilon parameter, an epsilon plus parameter, and an epsilon minus parameter.

54. A mobile station in a wireless network, comprising:
a de-rate matching module, the de-rate matching module being configured to de-rate match soft decisions received in a sequence, the de-rate matching module comprising:
a bit collection module configured to determine a stream tag for each soft decision in the sequence;
a pattern generator configured to determine a de-rate matching command for each soft decision in the sequence;
one or more logical blocks configured to sequentially process each soft decision in the sequence using the stream tag and the de-rate matching command for the soft decision, the sequence including soft decisions that are associated with different stream tags;
a first buffer configured to store, for each soft decision in the sequence, the stream tag and the de-rate matching command; and
a second buffer configured to store, for each soft decision in the sequence, the soft decision;
wherein the one or more logical blocks are further configured to retrieve the stream tag and the de-rate matching command from the first buffer and retrieve the soft decision from the second buffer at substantially the same time.

55. A method of implementing de-rate matching of soft decisions, the method being performed by a mobile station in a wireless network, the method comprising:
receiving the soft decisions in a sequence, the sequence of soft decisions including systematic bits, parity 1 bits, and parity 2 bits;
determining a stream tag for each soft decision in the sequence;
determining a de-rate matching command for each soft decision in the sequence; and
sequentially processing each soft decision in the sequence using the stream tag and the de-rate matching command for the soft decision, the sequence including soft decisions that are associated with different stream tags, including sequentially processing the sequence of soft decisions that include the systematic bits, the parity 1 bits, and the parity 2 bits.

* * * * *